United States Patent
Spievak et al.

(10) Patent No.: US 9,167,078 B2
(45) Date of Patent: Oct. 20, 2015

(54) SYSTEMS AND METHODS OF PROCESSING INBOUND CALLS

(71) Applicant: Invoca, Inc., Santa Barbara, CA (US)

(72) Inventors: Jason S. Spievak, Santa Barbara, CA (US); Colin D. Kelley, Santa Barbara, CA (US); Victor Borda, Santa Barbara, CA (US)

(73) Assignee: INVOCA, INC., Santa Barbara, CA (US)

( * ) Notice: Subject to any disclaimer, the term of this patent is extended or adjusted under 35 U.S.C. 154(b) by 0 days.

(21) Appl. No.: 14/608,030

(22) Filed: Jan. 28, 2015

(65) Prior Publication Data

US 2015/0249737 A1    Sep. 3, 2015

Related U.S. Application Data

(60) Provisional application No. 61/946,192, filed on Feb. 28, 2014.

(51) Int. Cl.
  *H04M 3/22* (2006.01)
(52) U.S. Cl.
  CPC .................................... *H04M 3/2281* (2013.01)
(58) Field of Classification Search
  CPC ...................................................... H04M 3/2281
  USPC ...................................................... 379/265.09
  See application file for complete search history.

(56) References Cited

U.S. PATENT DOCUMENTS

| | | |
|---|---|---|
| 5,651,054 A | 7/1997 | Dunn et al. |
| 5,956,343 A | 9/1999 | Cornes et al. |
| 6,256,381 B1 | 7/2001 | Donaghue, Jr. |
| 7,444,148 B1 | 10/2008 | Cook |
| 7,783,029 B2 | 8/2010 | Whitecotten et al. |
| 7,792,273 B2 | 9/2010 | Fano et al. |
| 7,818,195 B2 | 10/2010 | Coon et al. |
| 7,894,587 B1 | 2/2011 | Laurinavichus |
| 8,145,212 B2 | 3/2012 | Lopresti et al. |
| 8,238,540 B1 | 8/2012 | Duva et al. |
| 8,401,172 B1 | 3/2013 | Duva et al. |
| 8,577,016 B1 | 11/2013 | Duva et al. |
| 8,634,520 B1 * | 1/2014 | Morrison et al. ........... 379/88.02 |
| 8,671,020 B1 * | 3/2014 | Morrison et al. ........... 705/14.41 |
| 8,687,794 B1 | 4/2014 | Spievak et al. |

(Continued)

OTHER PUBLICATIONS

U.S. Appl. No. 13/529,198, filed Jun. 21, 2012, Duva et al.

(Continued)

*Primary Examiner* — Amal Zenati
(74) *Attorney, Agent, or Firm* — Knobbe, Martens, Olson & Bear LLP

(57) ABSTRACT

Methods and systems for reducing the impact of fraudulent or spam calls are disclosed. One or more calls to a first phone address are received, the first phone address not currently associated with a communication for a customer prospect. The calling party phone addresses associated with the calls received prior to the association of the first phone address to the first communication are stored. Then the first phone address is associated to the first communication. A first call to the first phone address is received. Prior to answering the first call and at least partly in response to a determination that a calling party phone address of the first call matches one of the previously stored calling party phone address, the first call is identified as a spam or otherwise undesirable call candidate and may be rejected.

9 Claims, 10 Drawing Sheets

(56) References Cited

U.S. PATENT DOCUMENTS

| | | |
|---|---|---|
| 8,755,511 B2 | 6/2014 | Duva et al. |
| 8,767,946 B1 | 7/2014 | Duva et al. |
| 8,781,105 B1 | 7/2014 | Duva et al. |
| 8,917,860 B2 | 12/2014 | Duva et al. |
| 2002/0110234 A1 | 8/2002 | Walker et al. |
| 2004/0028213 A1 | 2/2004 | Goss |
| 2005/0047580 A1* | 3/2005 | Mow et al. ............... 379/265.09 |
| 2005/0152338 A1 | 7/2005 | Chen et al. |
| 2005/0265322 A1 | 12/2005 | Hester |
| 2006/0184617 A1 | 8/2006 | Nicholas et al. |
| 2007/0088851 A1 | 4/2007 | Levkovitz et al. |
| 2007/0116227 A1 | 5/2007 | Vitenson et al. |
| 2007/0143182 A1 | 6/2007 | Faber et al. |
| 2007/0211881 A1 | 9/2007 | Parker-Stephen |
| 2007/0242626 A1 | 10/2007 | Altberg et al. |
| 2007/0248220 A1 | 10/2007 | Crandell et al. |
| 2007/0288312 A1 | 12/2007 | Wang |
| 2008/0004968 A1 | 1/2008 | Nakao |
| 2008/0011823 A1 | 1/2008 | Patel et al. |
| 2008/0037534 A1 | 2/2008 | Shina |
| 2008/0126476 A1 | 5/2008 | Nicholas et al. |
| 2008/0267388 A1 | 10/2008 | Odinak et al. |
| 2009/0006199 A1* | 1/2009 | Wang ............................. 705/14 |
| 2009/0046704 A1 | 2/2009 | Sternam |
| 2009/0088219 A1* | 4/2009 | Bayne .......................... 455/566 |
| 2009/0122728 A1 | 5/2009 | Aaltonen et al. |
| 2009/0147778 A1 | 6/2009 | Wanless et al. |
| 2009/0262917 A1 | 10/2009 | Delacey et al. |
| 2009/0299820 A1 | 12/2009 | Wang et al. |
| 2010/0002685 A1 | 1/2010 | Shaham et al. |
| 2010/0002865 A1 | 1/2010 | Kennedy et al. |
| 2010/0049679 A1 | 2/2010 | Phillips |
| 2013/0018712 A1* | 1/2013 | Wong et al. ................. 705/14.4 |

OTHER PUBLICATIONS

U.S. Appl. No. 14/546,452, filed Nov. 18, 2014, Kelley et al.

* cited by examiner

SYSTEMS AND METHODS OF PROCESSING INBOUND CALLS

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

FIELD OF THE INVENTION

The present invention relates to systems and methods for facilitating communications between individuals and enterprises in the context of product and service promotions and customer service management, and in particular, to methods and systems for managing fraudulent calls associated with said communications.

BACKGROUND

Although there has been a significant shift in the past decade towards the purchase of goods and services online, there are still a number of products purchased over the phone. However, many of these over-the-phone purchases are prompted by advertisements and promotions on the Internet. For media buyers, it is difficult to manage and measure the return on their investment for online, offline, and/or mobile advertisements that result in calls. In many cases, revenue is lost when a promotion results in a phone call that cannot be tracked back to the media buyer or web property carrying the advertisement.

Currently, there are organizations that publish content of interest to an audience of web users. Many of these organizations and distribution partners (termed "affiliates" or "publishers"), generate revenue through advertisements displayed in association with their content. Typically, the advertisements on a web page contain only a limited amount of information but include a link to advertiser web sites that provide further details often including a phone address (e.g., a phone number). If a potential customer calls the phone address to make a purchase from the advertiser, instead of making the purchase online, conventionally it may be difficult or impossible to determine which advertisements resulted in that lead. Such sales/lead tracking and Return On Investment (ROI) optimization is particularly challenging when there are multiple advertisements displayed on different online advertising channels while the sales transaction takes place in another medium (e.g., wireline and wireless telephony). In the case where a single advertisement is associated with a designated phone address and a suitable call tracking solution, the advertisement's performance may be easily determined; all calls to the phone address and all sales that resulted from the calls are driven by the aforementioned ad. However, it is rare that an advertising campaign only consists of a single ad and that the single ad is placed in a single advertising channel. A business with a series of online, offline, and/or mobile promotions (e.g., separate media outlets) will not likely be able to determine which advertisements were the most effective if all of the advertisements drive calls to one phone address.

What is needed are voice, fax, and/or video telephony capabilities integrated with marketing campaigns of varying complexity (e.g., simple or sophisticated marketing campaigns) which enable advertisers to determine and/or credit online promotions with offline telephony experiences. In addition, because these telephony experiences in association with campaigns may be subject to fraudulent communications, certain embodiments described herein are provisioned and configured with appropriate fraud countermeasures.

SUMMARY

Disclosed herein are systems and methods for facilitating communications between individuals and enterprises in the context of product and service promotions and customer service, and in particular, to methods and systems for detecting and eliminating fraudulent calls associated with said communications.

Further disclosed herein are techniques for marketing automation and telecommunications, and in particular, to methods and systems which can be utilized for tracking sales/leads, optimizing and organizing advertising campaigns where phone calls and optionally phone numbers are used creatively to track and manage ad spending. For example, certain embodiments track phone calls driven by each advertisement and associate meaningful values to each call that identify the attributes of the traffic source.

A given embodiment may include some or all of the features, functionality, systems and methods described herein.

Methods and systems for reducing the impact of undesirable (e.g., fraudulent or spam calls) are disclosed. In an example aspect, one or more calls to a first phone address are received, wherein the first phone address is not currently associated with a communication for a customer prospect. The calling party phone addresses associated with the calls received prior to the association of the first phone address to the first communication are stored. Then the first phone address is associated to the first communication. A first call to the first phone address is received. Prior to answering the first call and at least partly in response to a determination that a calling party phone address of the first call matches one of the previously stored calling party phone address, the first call is identified as a spam or otherwise undesirable call candidate and may be rejected. Optionally, at least partly in response to detecting a modem tone during the first call, the first call is identified as a spam call and the first call is rejected.

An example embodiment provides a method of computer implemented method of call processing, the method comprising: receiving over a network, by a computing system, one or more calls to a first phone address, the first phone address not currently associated with a marketing campaign communication; storing, by the computing system, one or more calling party phone addresses associated with the one or more received calls prior to the association of the first phone address to the marketing campaign communication; associating the first phone address to the marketing campaign communication; subsequent to the association of the phone address to the first marketing campaign communication, receiving, at the computing system, a first call to the first phone address; prior to answering the first call and at least partly in response to a determination, by the computing system, that a calling party phone address of the first call matches a stored calling party phone address included in the one or more calling party phone addresses associated with the one or more received calls prior to the association of the first phone address to the marketing campaign communication, identifying, by the computing system, the first call as a spam call candidate; and, at least partly in response to detecting a modem tone, by the computing system, during the first call, identifying, by the computing system, the first call as a spam call and rejecting, by the computing system, the first call; and, optionally the computer implemented method further comprising at least partly in response to detecting the modem tone, storing an indication that future calls from the calling party phone address of the first call are to be blocked; and, optionally the computer implemented method further comprising receiving a second call to the first phone address associated with the marketing campaign communication; and, at least partly in response to determining that a calling party address of the second call is associated with a stored call block indication, rejecting, by the computing system, the second call; and, optionally the computer implemented method further comprising: at least partly in response to detecting a call termination of the first call, occurring within a specified call period of time, identifying the first call as a spam call candidate; and, optionally the computer implemented method further comprising: at least partly in response to detecting, during a second call to the first phone address associated with the marketing campaign communication, a fax tone, identifying, by the computing system, the second call as a spam call; and, optionally the computer implemented method further comprising: at least partly in response to detecting, during a second call to the first phone address associated with the marketing campaign communication, a Dual-Tone Multi-Frequency (DTMF) tone, by the computing system, wherein the detected DTMF tone is an A, B, C, or D type tone, identifying, by the computing system, the second call as a spam call; and, optionally the computer implemented method further comprising: at least partly in response to receiving a second call during a specified marketing campaign state, identifying, by the computing system, the second call as a candidate spam call; and, optionally the computer implemented method further comprising: at least partly in response to receiving a second call during a specified marketing campaign state, identifying, by the computing system, the second call as a candidate spam call, wherein the marketing campaign state comprises an indicator of a position of a customer prospect in a marketing campaign funnel.

An example embodiment provides a system, comprising: a computing device; a network interface configured to be coupled to a Public Switched Telephone Network (PSTN); non-transitory media storing instructions readable by the computing device, that when executed by the computing device, cause the computing device to perform operations, comprising: associating a phone address to a communication wherein the communication is directed to a customer prospect; subsequent to the association of the phone address with the communication, receiving a first call to the first phone address; prior to answering the first call, generating a first score for the first call, wherein the first score is calculated based at least in part on at least a first attribute of the received call; prior to answering the first call, rejecting the first call if the first score satisfies a first condition; if the first score does not satisfy the first condition, answering the first call; subsequent to answering the first call, generating a second score for the first call, wherein the second score is generated based at least in part on a second attribute of the first call; and, identifying the first call as a spam call and rejecting the first call if: the second score satisfies a second condition, or if a third score, generated based at least in part on the first score and the second score, satisfies a third condition; and, optionally wherein the communication comprises a marketing communication associated with a marketing campaign; and, optionally the operations further comprising: at least partly in response to identifying the first call as a spam call, storing an indication that future calls from the calling party phone address of the first call are to be blocked; and, optionally the operations further comprising: receiving a second call to the first phone address associated with the communication; and, at least partly in response to determining that a calling party address of the second call is associated with a stored call block indication, rejecting, by the computing system, the second call; and, optionally wherein the second attribute of the first call comprises a length of the first call; and, optionally wherein the first attribute or the second attribute of the first call comprises detection of a fax tone; and, optionally wherein the first attribute or the second attribute of the first call comprises detection of Dual-Tone Multi-Frequency (DTMF) tone, wherein the detected DTMF tone is a numeric DTMF tone or an A, B, C, or D tone; and, optionally wherein the first attribute or the second attribute of the first call comprises receiving the first call during a specified campaign state; and, optionally wherein the first attribute or the second attribute of the first call comprises receiving the first call during a specified campaign state, wherein a marketing campaign state comprises an indicator of a position of the customer prospect in a marketing campaign funnel.

An example embodiment provides a system, comprising: a computing device; a network interface configured to be coupled to a Public Switched Telephone Network (PSTN); non-transitory media storing instructions readable by the computing device, that when executed by the computing device, cause the computing device to perform operations, comprising: receiving one or more calls to a first phone address, the first phone address not currently associated with a communication for a customer prospect; storing one or more calling party phone addresses associated with the one or more received calls prior to the association of the first phone address to the first communication; associating the first phone address to the first communication; subsequent to the association of the phone address to the first communication, receiving a first call to the first phone address, prior to answering the first call and at least partly in response to a determination that a calling party phone address of the first call matches a stored calling party phone address included in the one or more calling party phone addresses associated with the one or more received calls prior to the association of the first phone address to the first communication; identifying the first call as a spam call candidate; and, at least partly in response to detecting a modem tone during the first call, identifying the first call as a spam call and rejecting the first call; and, optionally wherein the communication comprises a marketing communication associated with a marketing campaign; and, optionally the operations further comprising: at least partly in response to identifying the first call as a spam call, storing an indication that future calls from the calling party phone address of the first call are to be blocked; and, optionally the operations further comprising: receiving a second call to the first phone address associated with the communication; and, at least partly in response to determining that a calling party address of the second call is associated with a stored call block indication, rejecting, by the computing system, the second call; and, optionally wherein the second attribute of the first call comprises a length of the first call; and, optionally wherein the first attribute or the second attribute of the first call comprises detection of a fax tone; and, optionally wherein the first attribute or the second attribute of the first call comprises detection of Dual-Tone Multi-Frequency (DTMF) tone, wherein the detected DTMF tone is a numeric DTMF tone or an A, B, C, or D tone; and, optionally wherein the first attribute or the second attribute of the first call comprises receiving the first call during a specified campaign state; and, optionally wherein the first attribute or the second attribute of the first call comprises receiving the first call during a specified campaign state, wherein a marketing campaign state comprises an indicator of a position of the customer prospect in a marketing campaign funnel.

BRIEF DESCRIPTION OF THE FIGURES

The disclosed aspects will hereinafter be described in conjunction with the appended drawings, provided to illustrate and not to limit the disclosed aspects, wherein like designations denote the elements.

DETAILED DESCRIPTION

Figure 1:
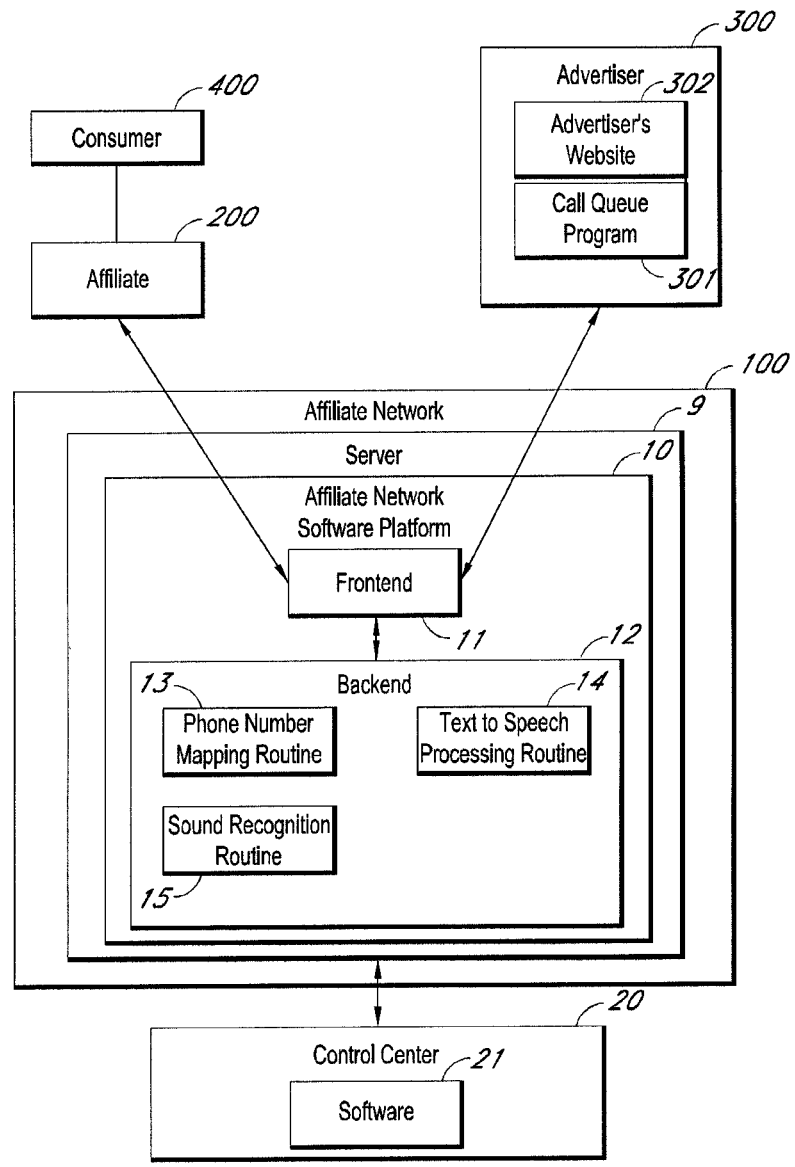
FIG. 1: illustrates an example system architecture.

The terms campaign and marketing campaign, as described herein, are intended to encompass generally any business work flow process used to achieve a specific objective. Optionally, a campaign includes as an attribute a collection of discreet events or steps (e.g., the sending of an email message). The terms campaign and marketing campaign as used herein are intended to be used interchangeably. For example, a campaign, may include a marketing campaign to promote a good or service for sale. In another example campaign, a marketing campaign is used to promote a company's brand. In yet another example, a notification campaign is used to notify a customer/user of a change in a company's terms and conditions. While the term campaign may be used herein with respect to certain embodiments for illustrative purposes, other types of campaigns may be used as well In addition, currently there are various marketing channels that can be used to promote goods and services including, for example, blogs, social networking, web page visits, search, etc. Coincident with online marketing channel evolution is the emergence of software-based tools that are focused on automating the marketing process within these various channels. This automation includes marketing campaign creation, launch, tracking, and reporting. While early, and generally rudimentary, marketing automation tools were initially developed by a company internally to facilitate marketing of the products they developed, more recently an industry of third party/outsourced marketing automation tools has emerged providing tools that may be used in conjunction with certain online marketing channels, and are capable of providing tracking and reporting. Disadvantageously, the conventional marketing automation tools provided by these third-parties are generally limited to the Internet medium, provide little or no telephony integration, and have failed to address the challenges posed by telephony integration.

What is needed is user and system friendly integration of voice, fax, and/or video telephony into marketing automation software/computing platforms. Conventionally, for example, a product manufacturer might use a marketing automation system to create an email marketing campaign. To add telephony features to the campaign, the manufacturer conventionally manually creates a parallel and separate telephony campaign to work in conjunction with the defined email marketing campaign. The lack of an integrated campaign generally results in campaign errors, cumbersome reporting and account access, difficulties in monitoring and adapting active campaigns, wasted effort and expense, etc.

Systems and methods for a marketing automation system which includes integrated telephony are described herein. Optionally, the marketing automation system is provided by a single provider to an end user. Optionally, the marketing automation system is provided by a conventional marketing automation platform provider and the telephony features are provided by a separate applications provider and which may be configured to integrate with the marketing automation platform. In the latter case, the telephony application, optionally purchased or licensed separately, is hosted and operates within the database and infrastructure of the conventional marketing automation platform. However, the telephony features offered by the telephony application may be subject to fraudulent communications. Therefore certain example embodiments are provisioned and configured with appropriate fraud countermeasures as described herein.

In the course of providing integrated telephony (including voice, fax, and/or video) service in the marketing of goods and services, providers are likely to encounter unscrupulous individuals and organizations who will attempt to defraud the providers. For example, fraudsters loosely associated with a rural Local Exchange Carrier or Competitive Local Exchange Carrier (CLEC) are known to originate fictitious calls to toll-free phone numbers in order to share in the reciprocal compensation paid out by the network carriers completing the calls. A provider of automated marketing services with integrated telephony subject to this type of fraud will likely experience higher telecommunication service fees. In addition, the fraudulent call traffic necessitates that the provider over-provision its network and call processing sub/systems to manage the unexpected calls. Lastly, the inflated call traffic distorts the marketing conversion performance (higher number of low quality calls) of an operational marketing campaign and wastes the time of agents handling such fraudulent traffic.

Conventionally, there are techniques that can be employed to reduce abusive calls. For example, a larger number of repeat calls and/or short duration calls from a specific calling party phone address (as determined, for example, from call signaling information associated with a call) are likely to indicate fraudulent calls. In this case, a conventional system can be configured to block all calls from the originating calling party phone address. However, changes to the telecommunication market, including the introduction of VoIP calling, have enabled calling parties to vary the calling party phone address for each call by modifying and/or spoofing the calling party phone address. Thus, defeating many of the conventional methods of reducing fraudulent calls.

What is needed are adequate counter measures to reduce and/or eliminate the occurrence and reporting of spam dialing or fraudulent calls (e.g., calls that are not from actual potential purchasers or users but are instead from malicious sources, and may be from autodialers) in marketing campaigns, such as those that include voice, fax, and/or video telephony marketing channels. Optionally, a multi-level system of detection and counter measures are used at different stages of a call and/or series of calls to reduce and/or eliminate as soon as possible the occurrence and reporting of spam dialing or fraudulent calls. In certain embodiments the overall goal is to differentiate between legitimate and undesirable/fraudulent calls with the lowest rate of false positives and the lowest rate of false negatives. In other words, filter as many undesirable calls as possible while minimizing or without filtering any legitimate calls. In certain embodiments there exist other constraints such as limiting the call length or caller interactions prior to connection/transfer.

Certain embodiments described herein may perform computational calculations and data analysis within strict real-time boundaries during a call. Other embodiments described herein may perform computational calculations and data analysis after a call is answered, connected, transferred and/or completed. In certain embodiments the analysis may be delayed, for example, due to heavy call volume and limited computational resources and/or unavailable data. Because call processing is inherently a real-time operation, there likely will be constraints on the scope of computation that is feasible. However, calls are also inherently different than, for example, a web page load because the call (including the call presentation) can be managed over the course of some number of seconds. This enables the possibility of performing a multi-stage filtering algorithm, wherein a computationally inexpensive filter is applied during the 1 second of the call, for example, but additional filters are run at a later period (e.g., 5 seconds and 10 seconds into the call), with that much more keystroke and recorded audio data.

In certain embodiments described herein predictive models may be utilized. Traditional predictive scoring models in the recommender engine genre are based around the concept of having users and items in a system. The predictive scoring engine tries to predict what score the user will give the item on some arbitrary scale (e.g., 1 to 5). Such engines typically have a threshold value and if the item's predicted score is above the threshold value, the item will be recommended to the user. The goal of such engines are to get the RMSE (Root Mean Square Error) to as low a value as possible (in other words, minimize the average distance (error) between the predicted score and the actual score (once known)). However, the use of predictive scoring models can be expanded by relaxing ideas of what might constitute a user and an item. Optionally, a user might be an imaginary meta-user that is responsible for determining if a call is fraudulent or not. Optionally, another user might be an imaginary meta-user that is responsible for determining if a call is spam. The item might be a call. A call whose score crosses the threshold may be considered spurious and treated differently.

In certain embodiments described herein a combination of predictive models may be utilized to improve detection results. An example of this is the example published by Koren in his paper "Factorization Meets the Neighborhood", which combines a latent factor model and a neighborhood model with excellent results. Latent factor models are based on the idea that a "thing", be it a user or an item, has inherent (latent) qualities (factors), and if those qualities can be represented by a numeric score, they can become part of a calculation that gives an overall score to the "thing". In certain embodiments, the "thing" is a call, and the way in which we translate the information we collect on calls into a vector of factor scores is domain-specific and novel as further described herein. Examples of call data which can be converted into a vector of latent scores include but are not limited to: detected dtmf tone combinations, detected dtmf tone cadence, detection of certain audio frequencies, etc. Neighborhood models are based on the idea that "things", be they users or items, in a system might be "like" other "things" in the system. Based on the scores assigned to those other "things" by the user, derive a predicted score for the item in question. In certain embodiments the neighborhood of similar calls is utilized. Optionally, the system determines via a mechanism, for each call, what other calls are in its neighborhood. This mechanism is referred to as a distance measurement. Preferred non-domain-specific distance measurements include Pearson and Hamming. In certain example embodiments the system determines domain-specific knowledge to create a unique, optimal measurement of distance between calls, optionally including time-window calculations.

Certain embodiments may be utilized with a variety of campaigns that integrate telephone and online aspects. For example a marketing campaign phone address may be published via an online channel (e.g., a Web page, a phone application, etc.) for users to call, where the number may be associated with a call center that process user orders or requests for information for products or services that are the subject of the campaign. In an example embodiment, the marketing automation system detects spam dialing (e.g., a repeated occurrence of calls, such as more than a specified threshold of calls) to one or more numbers/phone addresses associated with a marketing campaign (including toll-free numbers) by analyzing the calling party phone address. Suspected spam dialing phone addresses may be placed in a temporary or permanent block call list and some or all subsequent calls from the suspected spam dialing source are blocked (e.g., as an effective counter-measure for repeated calls from the suspected dialing phone addresses). Optionally, suspected spam dialing calls are automatically determined based at least in part on call frequency and/or call length (e.g., by identifying high frequency of short, long, and/or nearly identical duration calls). For example, spam indication thresholds may be set (e.g., by an operator via a user interface, where the system stores the settings in memory) with respect to the frequency of calls and/or the length of the calls so that calls above the frequency threshold within a specified period of time (e.g., more than 5 calls in 3 days), having a call length within a certain deviation of each other, and/or having a call length above or below a call length threshold are identified as spam. A window may be specified with respect to the variation in call length, so that calls having a call length within the window are considered to have identical or nearly identical call durations. Optionally, suspected spam dialing calls are manually placed in a temporary or permanent block call list (recorded by the system) in response to an agent (e.g., a sales or customer service agent) selecting a marketing automation platform user interface spam control in association with the handling of the call. Optionally, a designation of an inbound call from a platform separate from the marketing automation platform, for example a call center platform, occurs via an application programming interface over a data network. Optionally, agent designation of calls, including fraud designations are sent/retrieved to/by the marketing automation platform automatically in configurable time period increments (e.g., hourly, daily, nightly, at a specified hour, etc.) or manually under an operator's control.

In an example embodiment, call signaling associated with a call (e.g., placed using a conventional telephone, cell phone, VoIP phone, autodialer, or otherwise) is used, at least in part, to automatically determine if there is a calling party phone address indicative of spam dialing. Optionally, the analysis includes determining if a common calling party phone address (e.g., as determined from callerID information obtained from the call signaling information) is being used in repeated calls which exceed a call count threshold over a configurable time period. Similarly, the analysis includes determining if a common calling party phone address is being used in short calls (e.g., calls less than a configurable specified time period (e.g., 1 second, 3 seconds, 4 seconds, etc.)).

Optionally, the analysis includes determining if a small group of calling party phone addresses is being used in repeated calls and/or short, long or nearly identical duration calls. Optionally, the analysis queries one or more phone address associated internal or external databases (e.g., a Local Exchange Routing Guide (LERG)) to determine if the calling party phone address is a valid phone address. For example, a first database might be queried using the phone address to determine a phone type (e.g., landline, wireless, etc.) and then a second query using the phone type and some or all of the calling party phone address to determine the validity of the phone address. Optionally, the analysis includes determining if the phone address includes an unusual number pattern (e.g., by comparing the number pattern against suspicious number patterns in a suspicious number pattern data store or number patterns generated by a suspicious number pattern generator algorithm), such as, a consecutive sequence of the same number, a number increment sequence, for example, by 1, 2, 3, etc., a number decrement sequence, for example, by 1, 2, 3, etc., or other such common number patterns (e.g., which may be unlikely to occur by chance with respect to incoming calls). Optionally, a count of the number of short, long or nearly identical duration calls from the calling party phone address is compared against a configurable threshold and if the threshold has been exceeded, the phone address is considered spam and placed in the temporary or permanent block call list. Optionally, the call count for a repeat calling party phone address is reset to zero after a configurable time period (e.g., 1 hour, 1 day, 1 week, 1 month, 1 year, etc.) then stored in memory and the phone address is removed from one of the call blocked lists or its status is otherwise changed to indicate calls from the phone address are not to be blocked. Optionally, the calling party phone address for inbound calls are compared against the temporary or permanent block call lists and calls from phone addresses on the blocked call lists are not answered (e.g., the call is never completed) or the call is answered (e.g., immediately answered) and terminated (e.g., immediately terminated). Optionally, calls originating from phone addresses on temporary or permanent blocked call lists are subjected to additional fraudulent detection and prevention techniques as further described herein and a campaign, promotion or affiliate associated with such calls may be inhibited from receiving credit for such calls. Optionally, the system provides a user interface that enables a system operator to review, display, and/or edit (add or remove phone addresses or blocks of phone address) the blocked call lists. Optionally, the system tracks, and provides a user interface that enables a system operator to review and display blocked incoming call counts by phone address, blocks of phone addresses, by campaign, etc. Optionally, blocked inbound calls are excluded or not reported to marketing managers in a marketing campaign. Optionally, unblocked inbound calls identified as spam calls are excluded or not reported to marketing managers in a marketing campaign. Optionally, blocked inbound calls are included or reported to marketing managers in a marketing campaign, but are identified as blocked calls. Optionally, unblocked inbound calls identified as spam calls are included or reported to marketing managers in a marketing campaign, but are identified as spam calls.

In another example embodiment, similar to the example embodiment above, the marketing automation system detects spam dialing (a repeated occurrence of calls of short duration or nearly identical duration) to one or more phone addresses (e.g., toll-free numbers) by analyzing the charge number field in addition to or instead of the callerID field. Suspected spam dialing phone addresses are placed in a temporary or permanent block call list and subsequent calls from the spam dialing source are blocked or terminated. In this example embodiment, call signaling associated with the inbound call is used to determine if there is a charge number phone address indicative of spam dialing. In certain telephone network integration, for examples a trunk interface SS7 integration or VoIP network SIP-T integration, the call processing platform can access a call signaling field conventionally labeled the charge number field. This field indicates a phone address for which billing associated with the call is to be applied and conventionally is provisioned by a telecommunications carrier. Unlike the calling party phone address in the callerID field, which can be spoofed in some line side network configurations by unscrupulous characters, the charge number field may not be accessible to these same characters. Therefore, the same call analysis techniques described herein with respect to "calling party phone address" can be applied to the phone address located in the charge number field. As in the example embodiment above, if the charge number phone address is indicative of spam, the charge number phone address is placed on a temporary or permanent block call list. Optionally, the charge number phone address for inbound calls is compared against the temporary or permanent block call list and calls to the blocked call list are not answered (e.g., caller just hears ringing and call is never completed) or the call is answered immediately and terminated immediately. Optionally, as above, blocked inbound calls are not reported in a marketing campaign.

In certain spam dialing scenarios, machine-based systems are used to generate the call traffic to phone addresses (e.g., toll-free numbers) used in marketing campaigns. In many of these scenarios, data and fax modem dialing technology are employed in the dialing systems. Optionally, the marketing automation with integrated call processing system detects characteristics associated with spam modem dialing calls and takes appropriate call handling actions as further described below.

Incoming call characteristics before, during, or after answer associated with a machine-based calling system include but are not limited to one or more of the following: a data modem tone in the voice channel; a fax modem tone in the voice channel; the absence of speech in the voice channel after answer; the detection of machine generated Dual-Tone Multi-Frequency (DTMF) tones A, B, C, and/or D; the rapid detection of a plurality of DTMF tones in which the period between tones is less than a configurable threshold where the threshold can be configured to a time value which a user is unlikely to manually enter; the detection of one or more unexpected DTMF tones; the detection of a recurring pattern of DTMF tones across calls; the detection of a recurring pattern of unexpected DTMF tones; the detection of a busy tone; the detection of ringing or other unexpected call progress or network tone/announcements; and, the absence of speech in the voice channel in response to a verbal prompt directed to the caller (e.g., hello?) after answer. In an example embodiment, a call processing system or call processing subsystem (as further described herein, a call processing system can be a standalone system or can be a subsystem or component of a system which provides functions other than call processing, including for example, marketing automation campaign management) receives inbound calls to the one or more phone addresses (e.g., toll-free numbers) associated with a campaign (or not associated with a campaign but stored in inventory). Optionally, prior to forwarding, transferring, or bridging an inbound call to an operator (e.g., a customer service agent or sales agent), the call processing subsystem determines the likelihood of the inbound call originating from a spam dialer before taking certain actions such as blocking and/or not answering the call. In an example embodiment, the call processing sub/system signals the receipt of an incoming call to the network (e.g., PSTN) and monitors the voice channel for the detection of a tone (e.g., fax or data modem tone). Optionally, if a tone is detected, the call is not answered and information associated with the call (e.g., call signaling information associated with the received call and/or a recording of the speech channel) is logged and/or placed into a data store for post call analysis. Advantageously, monitoring the incoming call's speech channel without answering the call enables the operator to avoid some or all of the network call termination/answer costs associated with spam dialing calls. In another example embodiment, the call processing subsystem answers the call and monitors the voice channel for the detection of a tone. Optionally, if a modem tone is detected, the answered call is terminated and information associated with the call (e.g., call signaling information associated with the received call and/or a recording of the speech channel) is logged and/or placed into a data store. Advantageously, these answered spam calls are optionally terminated shortly after answer, are not directed to an agent, and are optionally not included in campaign call reports. Optionally, as an alternative to simply terminating a spam call, the call processing system may perform an action which might discourage future spam dialing to the called number including for example, responding with a modem acknowledgement tone, playing a voice response prompt, playing a not-in-service announcement, waiting an extended period prior to call termination after answer, and/or delaying answer. For example, a not-in-service announcement might cause the spam dialing system to manually or automatically remove the called number (e.g., a toll-free number used in a one or more marketing campaign) from their dialing list. Optionally, the call processing sub-system designates and/or categorizes those numbers which have been spam dialed and for which a call handling action described above has been performed. Optionally, the call processing sub-system designates and/or categorizes (e.g., as spam) calling numbers and/or creates call blocking lists using phone address identifiers associated with the call signaling parameters of the inbound calls including but not limited to: Automatic Number Identification (ANI), charger number, redirecting phone address, forwarding phone address, privacy indicator, etc. and applies subsequent call handling actions and reporting techniques as further described herein. Optionally, data analysis of future inbound calling behavior of the categorized phone addresses can be used to determine the best or a preferred call handling treatment for reducing and/or eliminating future spam dialing. In addition, low spam categorized phone addresses, optionally, can be subsequently used in campaigns with less aggressive spam counter measures as further described herein (as the categorized phone addresses may be less susceptible to future spam dialing). The calling party phone addresses associated with modem detected calls are optionally placed on temporary or permanently blocked call lists and subsequent calls from these phone addresses are subject to immediate call termination and/or additional fraud counter measures.

In another example embodiment, the call processing system answers the incoming call (e.g., wherein the calling party will no longer hear ring-back) and listens on the incoming voice channel for speech and/or background noise (e.g., dog barking, TV or radio audio, street noise, etc.) a configurable period of time prior to extending (e.g., transferring, forwarding, bridging, connecting) the call to an operator/agent. Optionally, recordings of the audio channel are stored in the system for post call data analysis, including for example, nightly and/or off-peak call volume periods. In this embodiment, the detection of speech and/or background noise (e.g., using a sound analysis and/or speech detection system) are an indication the call is likely not a machine-based dialer. Optionally, as the call is transitioned to an operator/agent, prior to answer (e.g. by the call center), and/or prior to agent answer (detection of a live agent's speech (as opposed to music on hold and/or announcements)), if speech and/or background noise are not detected prior to these events or before the expiration of the configurable time period, other call handling actions, call analysis, call monitoring, call prompting, and/or other fraud counter measures as described herein can be triggered.

In another example embodiment similar to the embodiment described above, the call processing sub/system acknowledges (e.g., signals) receipt of the call but does not answer the call for a configurable wait period of time. During the wait period, the call processing system monitors the inbound voice channel for speech and/or background noise. Optionally, if speech and/or background noise are detected, the call is immediately directed (e.g., before the expiration of the wait timer) to an agent. Optionally, in a call environment in which the call processing system continues participation in the call (e.g. a bridge call environment), an outbound call/connection to an agent is initiated during the wait period (to reduce the call hold time to the caller after the expiration of the wait period). Optionally, if no speech and/or background noise are detected at or prior to the expiration of the wait period, the call is not answered and/or additional fraud prevention steps as described herein are employed before extending the call to an agent.

In some cases, the spam dialer plays a looping recorded announcement after dialing. In an example embodiment, the call processing subsystem detects the recorded announcement as speech upon receipt of the call prior to answer. Optionally, the announcement is recorded and stored in a data store of the call processing subsystem. Optionally, at least a portion (e.g., the initial portion) of the voice channel content of subsequent calls is compared against one or more stored announcements. Optionally, if there is a match, the call is rejected or subjected to additional fraud counter measures (e.g., the placement/insertion of an IVR session after answer and before extending the call to an agent). The calling party phone addresses associated with looping recorded announcement calls are optionally placed on temporary or permanently blocked call lists and subsequent calls from these phone addresses are subject to immediate call termination and/or additional fraud counter measures as similarly described elsewhere herein.

In some cases, the spam dialer plays a recorded announcement on answer. In an example embodiment, the call processing subsystem detects the recorded announcement as speech. Optionally, the announcement on answer is recorded and stored in a data store of the call processing sub/system. In an example embodiment, the recorded announcement becomes a signature associated with inbound calls (analogous to the user of calling party address described herein). Optionally, a user interface control of the marketing automation platform is provided for display on a terminal to an agent that, if selected by the agent, indicates a high likelihood that the call was a fraudulent call (e.g., no caller response once connected to an agent). Optionally, the marketing automation platform stores information associated with the call including a recording of the announcement and a fraud flag or other indicator. Optionally, the recorded announcement and/or speech characteristics of the recorded announcement are placed on a temporary or permanent blocked call list and are subject to call handling, such as the call termination techniques described herein.

Optionally, the marketing automation platform assigns different weightings in association with different stored announcement recordings based upon one or more factors optionally including but not limited to: agent labeled fraud, the time of day (e.g., after hour calls are likely to receive a higher weighting), the day of the week (e.g., weekend and holiday calls (if the enterprise is closed)), the stage of a campaign, the network the call was placed from (e.g., landline, VoIP, wireless). Optionally, the marketing automation platform increases the weighting if a multiplicity of calls are made with the determined same announcement (e.g., by comparing a recording of the announcement in the incoming call against a subset or all of the stored recordings on the block call lists and/or by comparing speech characteristics or speech nuances of the announcement against the speech characteristics or speech nuances of the stored recordings on the block call lists). Optionally, the marketing automation platform increases the weighting if a multiplicity of calls are made with the same announcement. Optionally, the call processing subsystem/marketing automation platform compares certain or each incoming call announcement against some or all stored potential fraudulent announcements on the block call lists. Optionally, to manage computing resources and/or improve response performance, the call processing subsystem/marketing automation platform compares certain or each incoming call announcement against a subset of potential fraudulent announcements on the block call lists. Optionally, the announcement or a portion thereof, is translated into text and the comparison only involves the subset of fraudulent announcements with similar or the same text. Optionally, other speech characteristics determined from a speech pattern analysis of the incoming call announcement are used to select the subset for the comparison.

In another example embodiment, the call processing subsystem processes and defeats machine-based dialers by answering the call and prompting a spoken response from the caller. Optionally, if speech is detected in the inbound voice channel the call is directed to an agent, and if speech is not detected the call is terminated. In an optional variant of this example embodiment, the call processing subsystem prompts the caller to speak a phrase (which may include one or more words) and speech recognition technology (e.g., speaker independent voice recognition) is used to determine if a spoken utterance by the caller matches the prompted phrase. If there is no caller speech or if the speech does not match the prompted phrase, a determination may be made that the call is from a machine dialer and so is a spam call. In another optional variant, the call processing sub/system prompts the caller to enter/keypress at least one touch-tone digit on their keypad and if the correct digit is selected, the call is considered valid/not spam. Optionally, on a configurable basis, the system varies the prompted digit entry from call to call. Optionally, if the correct prompted digit entry is not detected the call is terminated or the caller is prompted to try again, optionally, with the user prompted to enter the same or a different digit. Optionally, if a single digit entry is configured for the call and multiple digits are detected the call is terminated or the caller is prompted to try again, optionally, with the user prompted to enter the same or a different digit. Optionally, the voice prompting to the user is configured by the operator or system as an Interactive Voice Response (IVR) session. Optionally, calls in which invalid digit entries are detected and/or calls in which no tone is entered are placed on a temporary or permanently blocked call list or suspected fraud call lists. Optionally, inbound calls from these numbers are blocked or subject to more aggressive fraud prevention counter measures (including directed to a live operator specifically assigned to managing fraudulent calls and, optionally, not directly associated with the marketing of goods and service services).

In an example embodiment, one or all of the spam dialing reduction techniques described above are used on a call. For example, an inbound call can be received by the call processing sub/system and monitored for speech for a wait period. If speech is detected during the wait period the call is directed to an agent. If speech is not detected during the wait period, the call is answered and an IVR prompt session can be inserted and played to the caller. Upon receipt of a caller response and/or a correct caller response, the call is directed to an agent. If speech is not detected during the wait period and there is no caller response to the IVR session, the call is terminated and/or other fraud detection and/or countermeasures are used.

In another example embodiment, heuristics are used to determine if and when spam dialing reduction counter measures are to be used in a campaign. For example, a campaign can be configured to initially begin with no spam dialing reduction counter measures. During the course of the campaign, the system monitors the inbound call count and the duration of calls or employs other fraud detection filters described herein. If the number or percentage of short duration or nearly identical duration calls exceeds a first threshold count over a first period of time, one or more spam dialing reduction counter measures described herein can be used. Optionally, the call processing subsystem begins with those detection and/or counter measures which cause the least call completion friction (that is, those detection and/or counter measures which require little to no action on behalf of the caller and enable the call to be connected to an agent in a timely manner). Optionally, the call processing subsystem automatically invokes more aggressive spam dialing reduction techniques until the problem is eliminated or the number and/or percentage of short or nearly identical duration calls falls below a second specified threshold count over a second period of time (optionally, where the first and second threshold counts and the first and second periods are the same or are different). Optionally, the call processing subsystem analytics determine over a series of call campaigns the optimal or preferred call/percentage threshold levels and associated time periods and automatically preconfigures these prior to the campaign start. Optionally, the call processing subsystem provides for display on a terminal editable optimal/preferred call/percentage threshold levels and associated time periods to marketing personnel/operators via a user interface. Optionally, the call processing subsystem analytics are different and selected based on anticipated characteristics of the campaign (e.g., the number of stages, types and number of media elements, etc.), the vertical market of the campaign (e.g., insurance industry, for-profit education, etc.), and/or the market segment (e.g., Business-to-Business, Business-to-Consumer, etc.). Optionally, the call processing sub/system analytics are also dynamically varied during a campaign based at least in part upon the number and/or types of calls including but not limited to: the calling device carriers (e.g., mobile vs. landline), the mobile device types (e.g., plain old cell phone, smartphone, tablet computer, etc.), the geographic location of the callers, etc.

As described herein, incoming caller data and call behavior are used to determine if the incoming call is a spam call. With respect to certain embodiments described herein, the use of the term "increased likelihood" by itself or together with other factors may categorize the call as a definitive spam call and the call may be terminated and/or other call handling treatment for suspected spam calls applied to the call as described herein. In certain embodiments information know about the called number at the time of the call is used to determine whether the call is a spam or misdialed number. For example, if a called number is not actively assigned to a campaign, the incoming call is highly likely to be a spam or misdialed call.

In certain embodiments the lack of information associated with a call signaling parameter is an indicator of a potential spam call. For example, in response to a query of a name data base of a landline phone address which results in an unknown caller, may indicate that the call has a higher likelihood of being a spam call than a phone address with a caller name. Optionally, the text of the caller name is compared against a set of name rules wherein the rules infer a higher likelihood of the call being a spam call. For example, a single letter name may indicate a potential spam call. Optionally, incoming calls subsequently identified as spam, using for example call behavior rules or called party attribution as described herein, are categorized and/or designated as spam and optionally placed on a call blocking list. Optionally, the caller name, if known, is an attribute used in a call blocking list and is used in subsequent call comparisons.

In certain embodiments an incoming call is generated in response to an online interaction. Optionally, if certain data associated with the online interaction is not presented in association with the call, the likelihood of the call being spam is increased. For example, if a query to a Web provider's persistent unique identifier (e.g., Google AdID or Verizon Precision ID) wherein a parameter of the query includes the calling party's phone address (or other identifier of the caller received from the call signaling information and/or one or more internal/external data store queries) indicates that an advertisement/promotion (e.g., an online web promotion and/or a promotion within app (e.g., a smartphone software application) with the called number has recently been displayed to the caller, then there is a high likelihood the call is not spam. Conversely, if the query result indicate that an advertisement/promotion has not been presented to the caller, the likelihood of the call being spam is increased. In another example, a call may be generated from within an online application. Optionally, if data from a software application associated with a call origination (e.g., a mobile device software application) is not presented via a telephony network (e.g., via a SIP message) or a network data interface in association with the call, the call has an increased likelihood of being a spam call.

In certain embodiments the designation of the type of call is an indicator or non-indicator of the call potentially being a spam call. For example, if the call is designated as a call from a mobile phone, this may indicate a lower likelihood that the call is a spam call. In certain embodiments a determination of the telecom carrier owner of the phone address (e.g. by querying a LERG data store) may indicated a lower or higher likelihood of a fraudulent call. For example, a call from an established carrier such as Verizon or AT&T may be less likely to be associated with a fraud call then a call from a small Competitive Local Exchange Carrier (CLEC).

Thus, certain embodiments may be utilized with a variety of campaigns that integrate telephone and online aspects. Optionally, in certain embodiments if a call to a marketing campaign phone address published via an online channel is identified as a spam or suspected spam call, the associated online promotion will not receive credit for the call.

In an example process, a producer/advertiser may create a campaign and make the campaign available to an affiliate. The affiliate may then manually assign a phone number to the campaign and/or the system may automatically assign a phone address (e.g., phone number) and integrate the phone number into the affiliate's web site (e.g., post the number or provide a link associated with the number on a web page). A user/consumer may then place a call to the phone number and is connected via the system to a call center associated with the advertiser. The call may be tracked and the affiliate is credited for the call. Optionally, if the system determines that the call is a spam call, using one or more of the techniques described herein, the system inhibits or reverses the crediting of the call to the affiliate.

FIG. 1 illustrates an example system architecture. The illustrated system architecture can be used to facilitate telephonic, email, SMS, and other forms of communication. Certain embodiments process and track communications to facilitate online ordering of items, such as products or services. Thus, the illustrated system architecture can optionally be used to reduce the amount of revenue that would be lost by affiliates should a consumer decide to call an advertiser to make the purchase as opposed to ordering the item online via the affiliate Website. Additionally, the illustrated system architecture can optionally be used to increase the amount of revenue generated from offline or online advertising by including promotional contact information in the offline or online media. Still further, the illustrated system architecture can prevent affiliates and/or campaigns from being credited with calls identified as spam calls using one or more of the techniques identified herein. Still further, the illustrated system architecture can prevent malicious parties from generating network compensation from spam calls, and thus, reducing the cost of providing integrated telephony services in association with campaigns.

As illustrated in FIG. 1, a consumer terminal 400 (e.g., a general purpose computer, a tablet computer, an interactive television, a phone with data network capability, a networked game console, etc.) is coupled to an affiliate via an affiliate system 200 (which optionally hosts a website on a web server) over a network (e.g., the Internet). The affiliate system 200 is coupled over a network (e.g., the Internet) with an affiliate network via affiliate network system 100. The affiliate network system 100 includes a network interface, a server 9, and an affiliate network software platform 10 which executes on the server 9. The affiliate network software platform 10 includes a frontend 11, which communicates with the affiliate system 200 and with an advertiser system 300 (which includes a website 302 hosted on a web server, a call queue program 301, and a user terminal).

The affiliate network system 100 includes a backend 12. The backend 12 includes phone number mapping software 13, a text to speech system 14, and a sound/speech detection and recognition system 15. The server 9 is coupled via a network to a control center system 20, which includes application 21. In an example process, a producer/advertiser may create a campaign and make the campaign available to an affiliate. The affiliate may then assign a phone number to the campaign and integrate the phone number into the affiliate's web site (e.g., post the number or provide a link associated with the number on a web page). A user/consumer may then place a call to the phone number and is connected to a call center associated with the advertiser. The call may be tracked and the affiliate and may be credited for the call. Optionally, if the system determines that the call is a spam call, using one or more of the techniques described herein, the system inhibits or reverses the crediting of the call to the affiliate.

Figure 2:
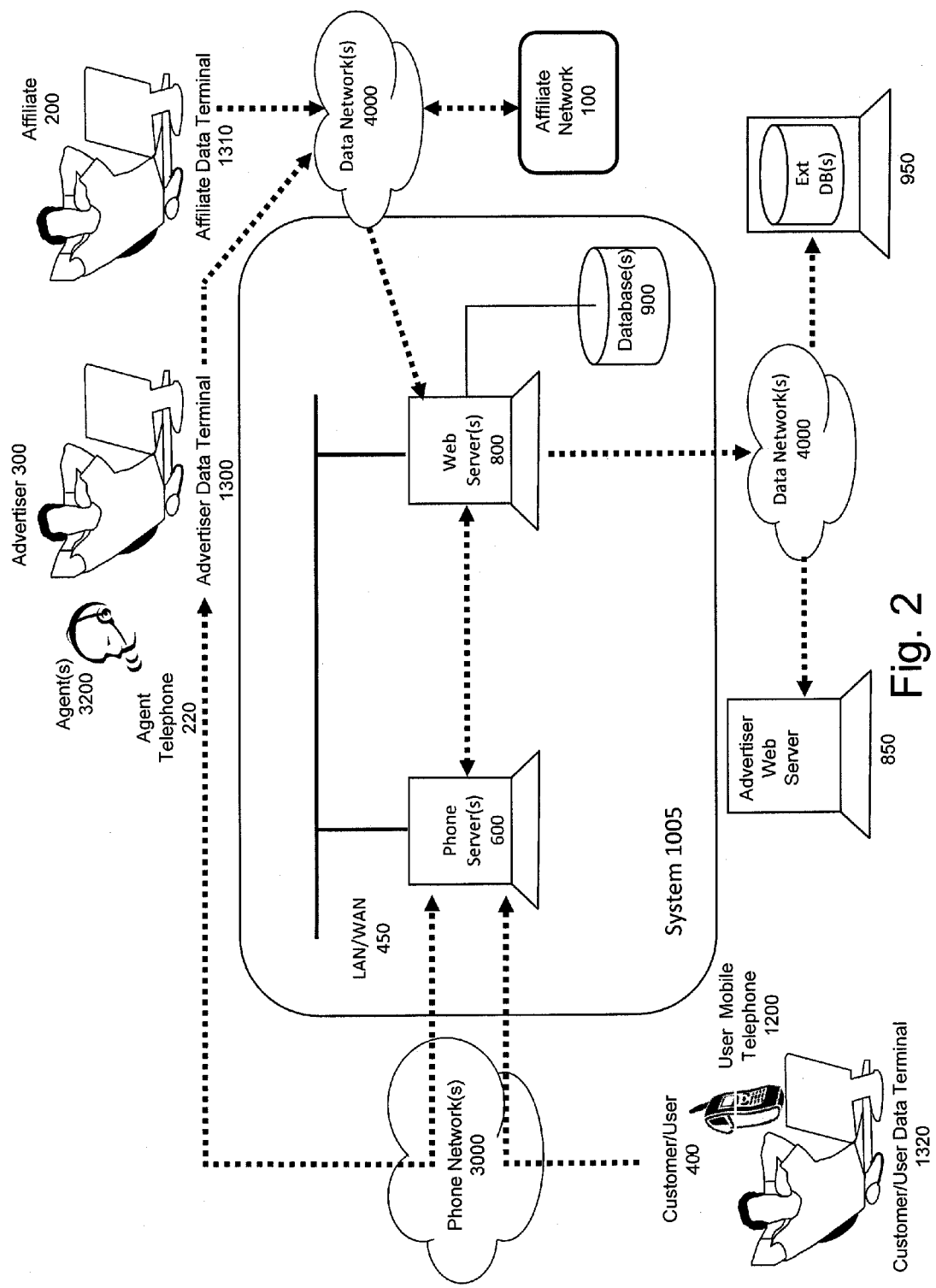
FIG. 2: illustrates an example system architecture.

FIG. 2 illustrates another example system architecture 1005. Optionally, the elements of system architecture 1005 can be included in the example affiliate network system 100 of FIG. 1. The illustrated system architecture 1005 can be used to facilitate communications between individuals and enterprises in the context of product and service promotions and customer service management. As illustrated, the system is connected or connectable to a plurality of consumers/customers/users 400 and the users' mobile phones 1200. The mobile phones 1200 are connected to a phone (wireless) network 3000 and data network 4000. Optionally, wireline phones (not shown in FIG. 2) are connected to a phone (wireline) network 3000. Optionally, the Customer/User 400 can access one or more data networks 4000 (e.g., the Internet or a corporate LAN or WAN, optionally to access web sites and associated web pages) using their mobile telephone computing device 1200 (e.g., smart phone, tablet phablet, etc.) and/or their personal computer/user data terminal 1320. The data/computer terminals 1320 can be a personal computer having a display, keyboard, memory, and a data communication interface. In addition, the computer terminal 1320 can be an interactive television, a networked-enabled personal digital assistant (PDA), smart phone, tablet computer, phablet, smart watch, or the like. Optionally, the system includes the Affiliate Network 100 and Control Center 20 (see, for example, FIG. 1).

As further illustrated, the system 1005 may interact with a plurality of advertiser and affiliate computer/data terminals 1300 and 1310, respectively. The data/computer terminals 1300 and 1310 can be a personal computer having a monitor, keyboard, memory, and a data communication interface. In addition, the computer terminal 1300 and 1310 can be an interactive television, a networked-enabled personal digital assistant (PDA), a smart/wireless phone 1500, tablet computer, phablet, smart watch, or the like. The data/computer terminals 1300 and 1310 are connected to a data network 4000 (e.g., the Internet or a corporate LAN or WAN). The data network 4000 optionally includes wireline data networks (e.g., the public Internet accessed using dialup, DSL/cable, or other modems) and wireless data networks (e.g., wireless mobile and WiFi data networks).

As further illustrated, the system 1005 integrates with a plurality of customer service and/or sales agents 200 via the phone network 3000 and data network 4000. Optionally, the agents 3200 have a wireline/wireless phone and/or a phone headset 220 used to communicate with customer's/user's 400.

The system's 1005 phone servers 600 and web servers 800 may be interconnected through Data Network 4000, via a private Local Area Network (LAN), and/or via a private Wide Area Network (WAN) 450—as illustrated in FIG. 2.

The system 1005 in this example contains centralized and/or distributed databases 900 and/or a general-purpose storage area, optionally including, but not limited to, some or all of the following: an advertiser database, an affiliate database, an affiliate network account database. One or more of the data-based may store some or all of the following: configured campaigns and campaign attributes, phone numbers/addresses, call routing rules, call records, call recordings, advertising creatives information, etc. The detailed call transaction information associated with a call may include some or all of the following information: call signaling, call duration, call content (e.g., recording of call and conversion of recorded data), call type (e.g., inbound, outbound, fax, voice), call routing, call bridging, call termination states (far-end, near-end disconnect), voice prompting (e.g., IVR trees), caller interactions (e.g., including speech and dtmf tone interactions), and/or other information. The detailed call transaction may be stored in databases 900 and/or general-purpose storage areas. Optionally, the call transaction information is provided or accessed for data mining. Optionally, the call transaction information can be used and/or integrated/associated with internal and/or external databases 950 (using, for example, data network 4000) in order to, for example, collect additional information about a caller. Optionally, the stored data can be used in marketing campaigns to improve customer prospect targeting and the efficacy of the campaign (including stored explicit data and implicit data derived from other data stores). Optionally, the stored data can be used in retargeting marketing campaigns.

The system 1005 in this example contains a phone server subsystem 600, optionally with call and fax processing and call bridging capabilities. Optionally, the servers bridge calls between users, advertisers (e.g., advertisers' call centers), and/or third parties (e.g., an outsourced call center). User calls optionally are received by (inbound) or originated from (outbound) the phone server subsystem 600. Additionally, advertiser/third party calls are received by (inbound) or originated from (outbound) the phone server subsystem 600. For example, a call center agent places a call to the phone server subsystem 600 and the phone server subsystem originates an outbound call to a user who expressed an interest in a product or service, or in response to a gesture on a web-page (e.g., click-to-call). These servers 600 optionally provide interactive voice response, voice messaging, voice recognition, and/or text-to-speech services, fax server features, and voice message transcription to natural-language text conversion. Optionally, the phone server's services (e.g., text-to-speech) utilized in a call are configurable (e.g., a specific interactive voice response tree or sub-menu) and may be determined based in whole or in part on attributes of the caller and/or called party and/or other call quality criteria (e.g., time-of-day, terminal device of caller or called party, etc.).

The system 1005 in this example contains a web server and general purpose server subsystem 800 with web serving and general computing capabilities.

The system 1005 in this example optionally interfaces with (e.g., over a data network 4000) with one or more external web servers, including an Advertiser Web Server. Optionally, the web server(s) 800 host one or more web pages of publishers and/or advertisers. Optionally, the system 1005 redirects users to an Advertiser's Web Server 850. Optionally, the system 1005 redirects consumers/users to an Advertiser's Web Server where the redirect includes one or more phone addresses from a phone number pool wherein the phone address is optionally used as a tracking element.

In this example, the system 1005 servers 600 and 800 are optionally centralized at a given location, or distributed over a number of locations. The system 1005 can be implemented as a Software as a Service (SaaS) system (e.g., a system used by a number of service providers) or the system can be integrated into a service provider's internal systems (e.g., an affiliate network). Optionally, the system 1005 is connected to a data communication network 4000 and a wireline/wireless network 3000. The system 1005 interconnects with the wireline/wireless network 3000 using telecommunication interfaces (e.g., SS7) and via data communication networks 4000 using a secure router subsystem and an SMS server subsystem which optionally serves as a mail relay to transmit and receive SMS and MMS messages via a Short Message Service Center (e.g., an SMSC operated by a network carrier).

The system may access the physical/geographic location of the user's mobile device 1200 by accessing a third party system or third party database which is capable of tracking the user's mobile device's location. Geographic location information and/or approximate geographic location of a caller (e.g., a customer and/or customer prospect) is optionally determined. For example, the geographic location information and/or approximate geographic location of a caller is optionally determined from call signaling information associated with an inbound call as described above. In addition, a call signaling parameter labeled the Jurisdiction Information Parameter (JIP) in an SS7 IAM (Initial Address Message) message or SIP-T parameter can optionally be used to determine geographic location information associated with the caller. In an example embodiment, the JIP parameter is populated with a NPA-NXX number (e.g., a 6 digit NPA-NXX number) when an inbound call transits from the wireless network to the wireline network. This NPA-NXX indicates a geographic area from which the wireless call originated, where the NPA portion indicates the area code from which the call originated and the NXX portion indicates the telephone office exchange from which the call originated. This information optionally can be used to transfer the call to, for example a merchant or call center location, nearest or relatively closer to the user. Optionally, an administrator configures an IVR tree to interact with the user to, for example, ask permission to obtain the user's location information directly or from a separate data source.

Optionally, a user is tracked across one or more computing devices (e.g., a phone, a laptop computer, a tablet computer, a set top box, etc.) using, for example, a persistent unique identifier. Optionally, one or more servers of the system architecture can access a persistent unique identifier platform from a provider over a data network 4000 in order to obtain user tracking information.

In another system architecture, a system/platform includes one or more networked computing servers, data stores (e.g., databases), networking infrastructure, telephony capabilities optionally including call routing, switching, and bridging, and a collection of general purpose and specific (e.g. voice recognition) application/system software as described above. In addition to some or all of the components described above with respect to example architectures 100 and 1005 above, a system/platform optionally includes a marketing automation software application and a centralized or distributed marketing data store, software analytics, user interfaces, dashboards, and a reporting application. Optionally, the telephony capabilities/subsystem is configured remote and/or separate from the marketing automation software application/platform and its associated network-based servers and data stores. Optionally, one or more network interfaces enable data transfers between the telephony subsystems and marketing automation platform. Optionally, the telephony capabilities/subsystem is offered by a provider separate from the marketing automation platform provider and the systems are integrated via one or more Application Programming Interfaces (APIs) over a network. Optionally, telephony subsystem and marketing automation platform are provided via a cloud-based service and/or Software-as-a-Service (SaaS) model. Optionally, in a cloud or SaaS operational implementation, one or more of the subsystems (e.g., telephony, marketing automation platform, web servers, etc.) are operated by one or more service providers.

Optionally, the system/platform includes a centralized marketing application which is used to create and manage the marketing programs and associated program stages, tracks each customer prospect and stores (e.g., in a centralized data store) the tracking information and any inferred and declared data associated with each customer prospect. Optionally, the marketing program is integrated with and receives detailed tracking information from numerous internal and external system providing the online and offline (e.g., telephony and call processing subsystems) customer prospect interactions including, for example, but not limited to some or all of the following: email: list storage and generation, sending, monitoring; web-site: corporate, landing pages, and microsites; blogs: postings, monitoring, and management; webinars/webcasts/videos/online courses: invitations, registrations, attendance, viewing, delivery, and posting; free trials: invitations, registrations, activity, termination; downloads: invitations, registrations, delivery status; free software: invitations, registrations, activity, termination; documents: postings, monitoring, and management; integrated or public application directory: invitations, registrations accessing, searching, perusal; widget: gadget; invitations, registrations, delivery status, type, activity/usage, updates; social media: monitoring (including a monitoring service), postings, sharing, liking, modified status; RSS/XML feed: postings, monitoring, and management; survey: invitations, registrations, completion, acknowledgement; search activity: term list management, monitoring; certifications: invitations, registrations, outcome determination, award/denial management; podcasts: invitations, registrations, activity, terminations, streaming, downloads.

Optionally, the implicit and explicit data (including for example recorded phone calls and associated transcriptions) and transaction data described above are stored in one or more databases and/or general purpose data stores. Optionally, this data is available for data mining. Optionally, one or more customer prospects may be placed into a different and/or subsequent marketing campaign/program based upon an indication from the data mining that the customer prospect is likely to be interested in and/or need a product and/or service. Optionally, the customer prospect is retargeted in a marketing program based at least in part upon an analysis of the stored data associated with the marketing program. Optionally, other data may be captured with respect to marketing programs/campaigns includes, for example, program start/end dates, converted prospects, program costs in terms of both expenses and staff. Optionally, historical marketing campaigns and/or best practice campaigns and the associated data/metrics are stored and available for review, comparison, trend analysis, and/or cloning for new campaigns.

Optionally, the system's/platform's one or more dashboards/reports provide staff (e.g., marketing and/or sales personnel) real-time and/or near real-time information on customers/prospects interacting with marketing media associated with the company and/or marketing campaigns. Optionally, the platform enables the distribution of these real-time customer engagements to company personnel (e.g., sales agents). Optionally, the system/platform enables the recipients (e.g., sales agents) to view information (e.g. via computer displays) associated with the customer's/prospect's current engagement and/or other information associated with the customer/prospect including for example, attributes/characteristics, marketing program state, call events data (including, for example: call type (e.g., voice, fax, cell, video, VoIP (e.g., Google Voice), Face time, Skype, etc.); inbound or outbound; call duration; call signaling information (calling party, called party, private, charge number, direct, forwarded, busy, etc.); conferenced call; bridged call; call termination state (e.g., far-end termination, near-end, bridge); type of called number (e.g., toll-free, local, long distance); called or calling device type), etc.

Optionally, the system/platform generates alerts or notifications to sales/marketing/support/executive staff personnel in response to a condition, including in response to one or more conditions discussed herein. Optionally, the alerts are sent via messaging services such as email. Optionally, the alerts are sent as a text message via SMS/MMS, an instant message, a widget/gadget display, a customized client software application, and/or an outbound call. Optionally, the condition is triggered, for example, by an event such as, by way of example, one or more of the following: a time period expiration, a marketing program state transition, an attribute/characteristic of a prospect/customer determined by the system, an attribute/characteristic prospect/customer state change, a type of call or message (e.g., inbound voice call/message, outbound voice call/message, inbound fax call/message, outbound fax call/message,), content of a voice call or message (e.g., as determined by an analysis of a transcribed call or message), content of a fax call (e.g., as determined by an analysis of the text in the fax and/or certain completed fields, optionally including a signature field), etc.

Optionally, the system/platform includes one or more sales/marketing/executive-level friendly user interfaces (e.g., reports and/or dashboards) which enable one or more views and/or analysis into the stored data including, for example, trends, program performance, alerts, efficiency, program design, etc. Optionally, the system/platform includes one or more customizable views and/or analysis into the stored data which can be used by business analyst or other technical resources to build custom reports to meet specific needs of the organization and/or to derive particular insights from the data. Optionally, the data stored in the system/platform can be exported to other analytic programs/processing systems.

Optionally, the system/platform provides real-time and/or near real-time information via dashboards/reports to staff (e.g., marketing and/or sales personnel) on customers/prospects interacting with marketing media or media elements associated with the company and/or marketing campaigns. Optionally, the platform enables the distribution of these real-time customer engagements to company personnel (e.g., sales agents). Optionally, the system/platform enables the recipients (e.g., sales agents) to view information associated with the customer's/prospect's current engagement and/or other information associated with the customer/prospect including for example, attributes/characteristics, marketing program state, etc. Optionally, the current information is made available (e.g., via a data network interface) to other applications/systems including, for example, a CRM (customer relationship management) application Optionally, the system/platform supports a collection of user interfaces for creating marketing programs/campaigns and for routing leads out of the funnel to the appropriate organization (e.g., customer care, sales, VIP sales, etc.) and/or individual. Optionally, the user interface is presented on a display by a customized software client. Optionally, the user interface is presented in one or more existing sales force automation client interfaces. Optionally, the user interface is presented via standard clients including, for example, a web browser (e.g., Chrome, Firefox, Safari, Internet Explorer), and/or a mail client application (e.g., Microsoft Outlook).

Marketing Campaign

The creation, launch, tracking, and analysis/reporting of a marketing campaign involve a number of states. Examples of such states in the creation of an example marketing campaign/program are discussed below, with reference to example aspects of telephony integration. Methods and systems for detecting and eliminating fraudulent calls during a marketing campaign enable marketing personnel to improve the efficacy of campaigns and reduce campaign costs (e.g., by not paying for fraudulent or misdialed calls).

Campaign Design

Before a sales campaign can be launched it needs to be designed by, for example, a marketing manager. Campaign design includes but is not limited to establishing target sales objectives, choosing campaign offline/online media and channels, defining campaign elements, campaign messages, etc. Optionally, the defined campaign elements, communications, and/or media elements include, for example, direct mail templates, email templates, web landing pages, web forms, web ads, search, video programs, mobile ads, social media, microblogging, social network account, virtual events, etc. The campaign definitions may be defined using one or more of the systems described herein (which may present corresponding user interfaces to enable a user to provide such definitions), which may also store such definitions. The system may also execute the campaign in whole or in part using such campaign definitions.

Optionally, the defined campaign element, communication, and/or media element are assigned a phone address automatically and/or by a user/operator via the marketing automation platform. Optionally, the defined campaign element and/or media element are assigned a phone address automatically by the marketing automation platform. Optionally, the automatic assignment of a phone address to a campaign and/or media element occurs at least partly in response to a triggering event or condition. Example triggering conditions may include, but are not limited to, the media elements described elsewhere herein with respect to lead scoring and/or lead nurturing. For example, a triggering event or condition may include the display of a web-based landing page to a customer prospect or the download of an application or media by a customer prospect. The triggering event or condition of a number assignment (and which type of phone address to use (e.g., toll-free or local)) can further be configured by an operator via a set of filters (or additional conditions) which are established based at least in part upon information collected, known, or accessible by the marketing automation platform about the customer prospect (e.g., explicit and implicit attributes used in lead scoring and/or a lead score, as described elsewhere herein). For example, in a marketing campaign, if the customer prospect is known or determined to be younger than seventeen (a customer prospect attribute), a phone address may not be assigned (a filter) in an initial introductory email (a media element) or only a toll-free number might be assigned (a type of phone address). Optionally, as further described herein, the campaign/media elements, triggering events or conditions, customer attributes, lead scores, etc., are used to fixedly or dynamically (e.g., in substantially real-time) route inbound and outbound calls to configured destinations/phone addresses.

Optionally, in the campaign design stage, the user also defines and/or configures, via the system, dashboards and/or reports to be used during the campaign and the system stores the defined dashboard or report definitions and/or configurations. Optionally, the user also plans for and defines one or more test offers, optionally including A/B testing. Optionally, at this stage (or at another stage), the integration of voice and fax telephony services is included in the campaign definition. For example, at this stage of the marketing funnel, phone addresses are presented/placed in the online and/or offline media (e.g., television advertisements, radio advertisements, newspapers, etc.). Optionally, phone services are included in initial emails to the target customers. Optionally, phone services are used later in the funnel, for example, on a web landing page after the customer prospect has clicked on a link in one or more emails that causes the landing page to be presented to the user via a user browser hosted on a user terminal. Optionally inbound calls to displayed phone numbers/addresses are routed to a call center or an inbound sales center through a call processing platform.

Example 1

Figure 3:
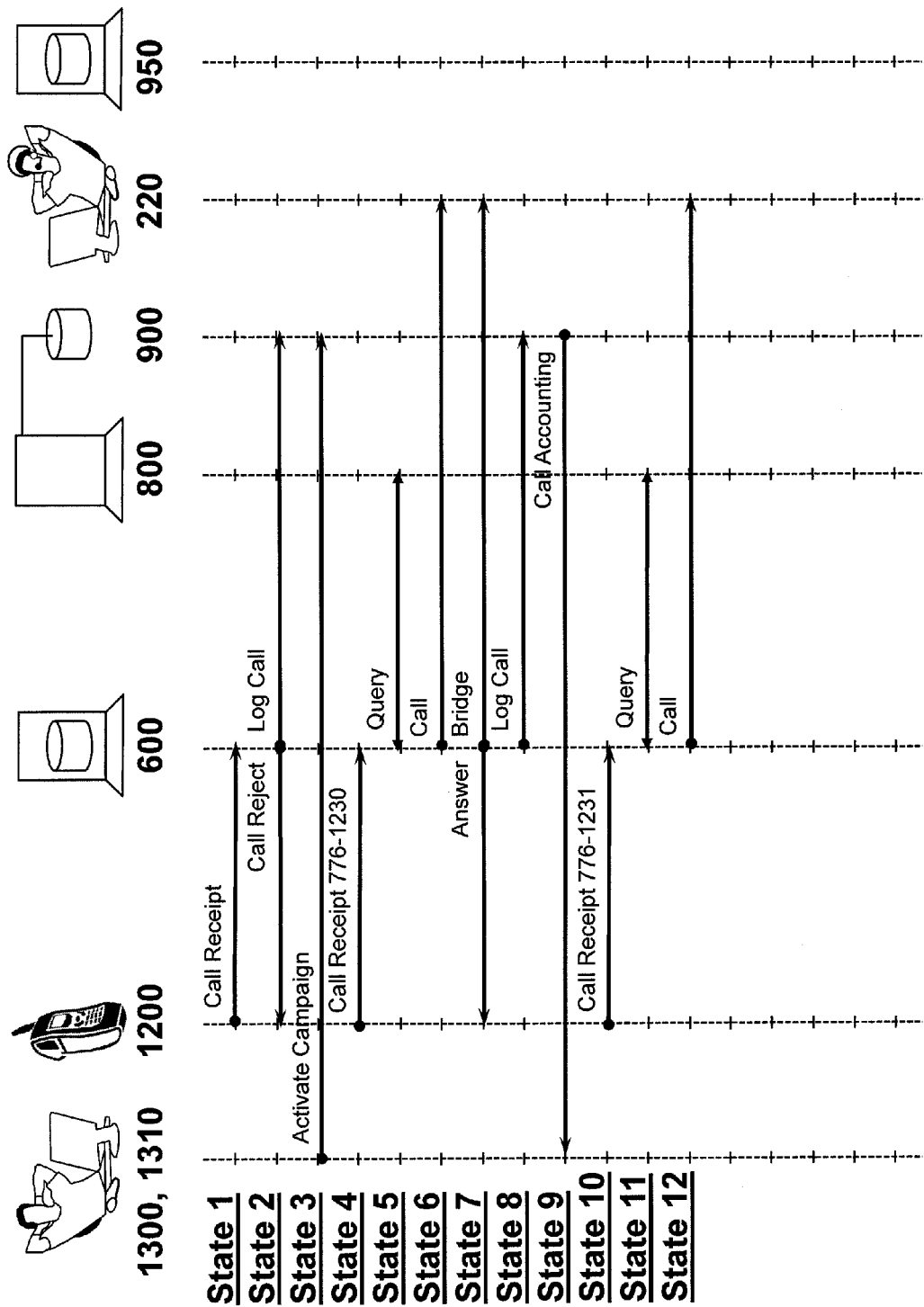
FIG. 3-5: illustrate an example first operating environment/process for a communications system.
Figure 4:
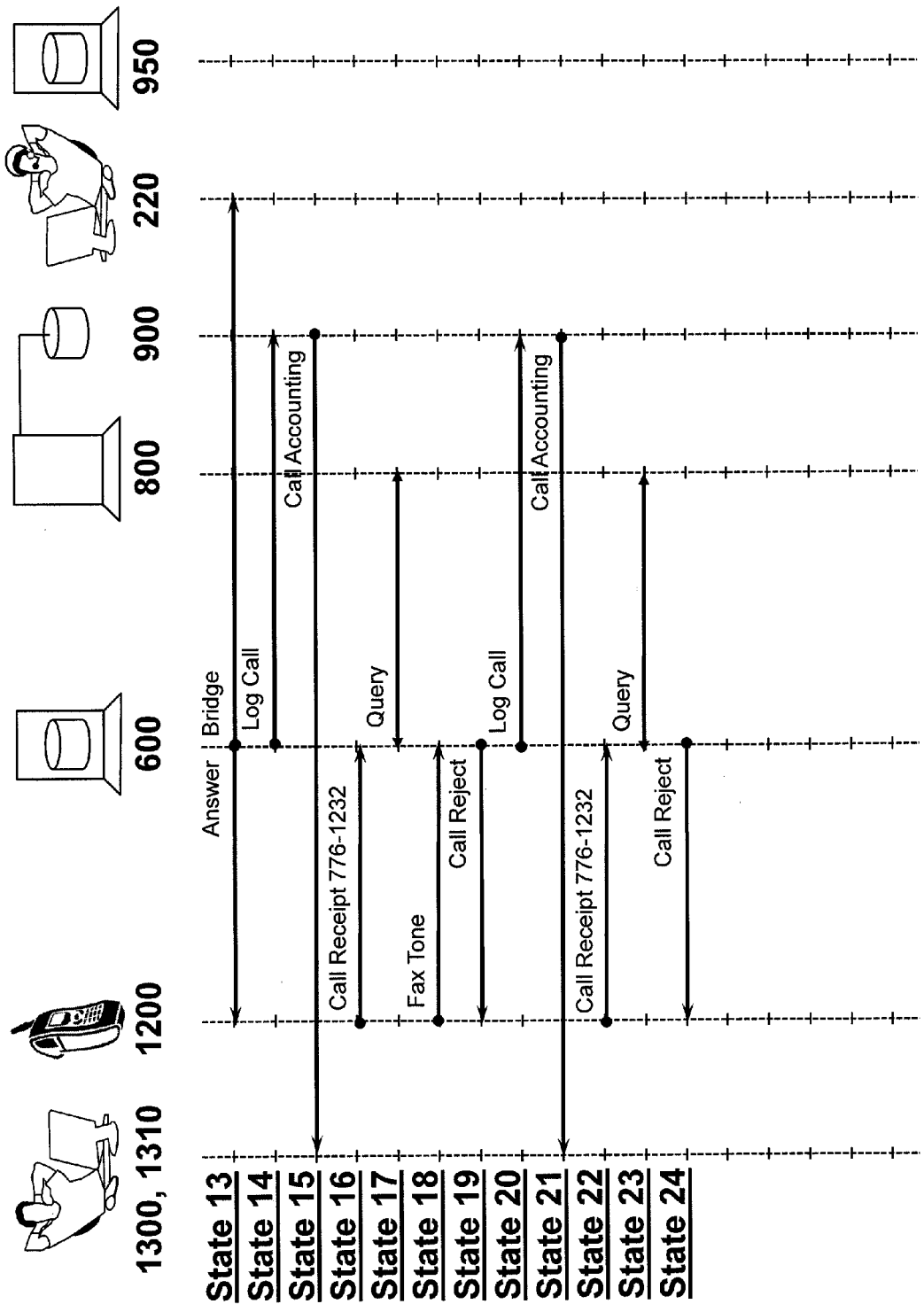
Figure 5:
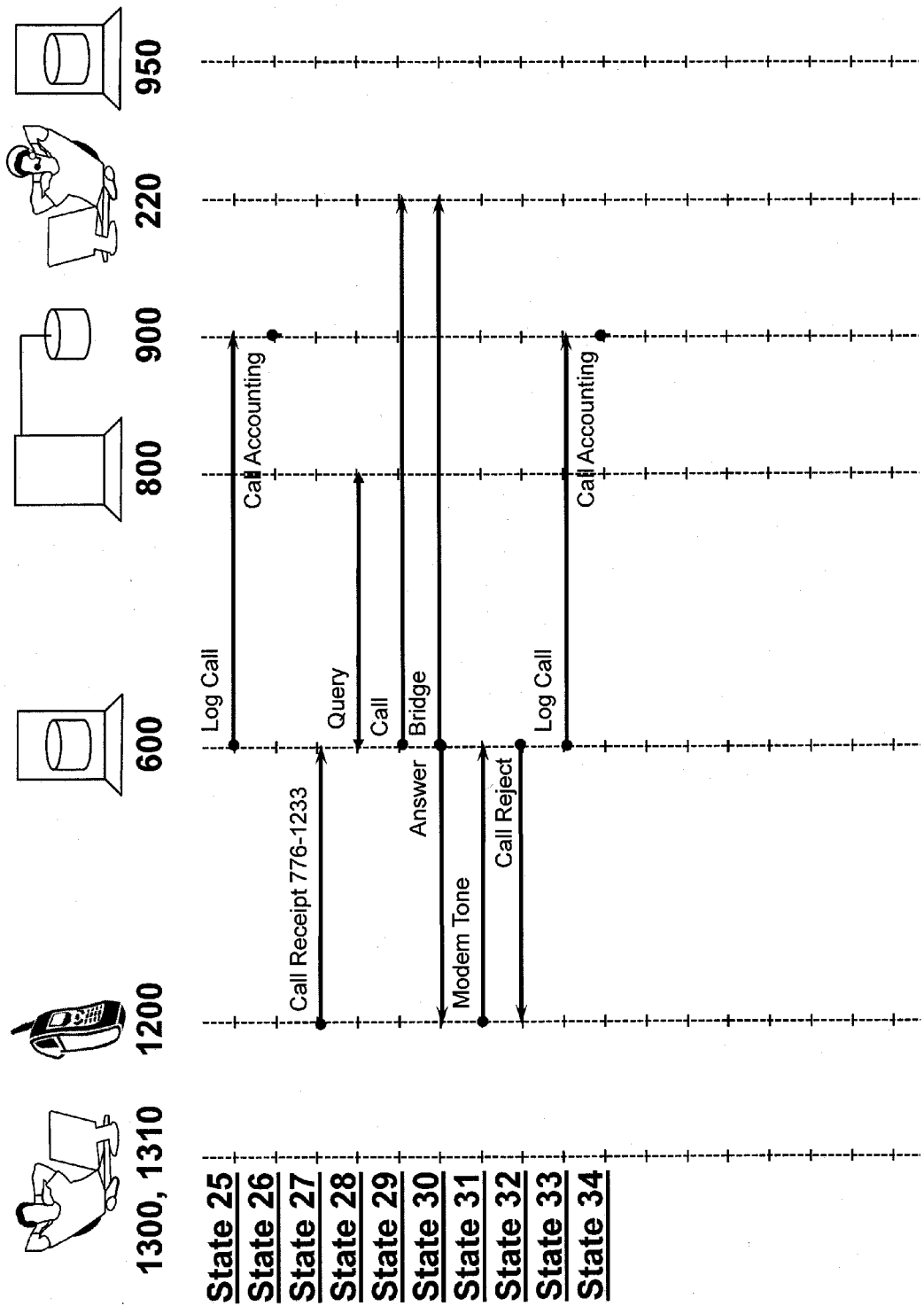

FIGS. 3 through 5 illustrate a first example operational flow of the system 1005 discussed above. Process states are listed on the left and elements of the operating environment of FIG. 2 are listed across the top. The states below depict an example embodiment of the system 1005 in which a marketing campaign of a merchant engages a collection of prospective customers regarding a 4$^{th}$ of July storewide sale. In this example embodiment, during the course of the marketing campaign, the system 1005 identifies certain calls as potential fraudulent and fraudulent (e.g. spam) calls. Further, in this example embodiment, the system 1005 does not charge the merchant for determined spam calls.

In the example embodiment below, to better example the operational flow, the states below are intended to highlight/overview the operation of the system 1005 and not detail every operation of the system in an example marketing campaign. In the example embodiment below, the merchant/advertiser 300 previously created an account in the system 1005 and configured a marketing campaign (e.g., in a marketing automation system operating in conjunction with the system 1005 or as an integral part of the system 1005).

State 1 of FIG. 3.

In this example embodiment, the server 600 receives a call directed to a toll-free number, 800-333-1000, wherein the toll-free number is allocated from a pool of numbers assigned to the system 1005 (or the provider of system 1005). Optionally, the call is a Public Switched Telephone Network (PSTN) call received, for example, by the system over an IP connection. Optionally, a collection of conventional call signaling information associated with the call is received including, for example, call type (landline, cellular, data), forwarding, calling party identification, called party identification, charge number, call privacy indicator, call jurisdiction, etc.

State 2 of FIG. 3.

As the phone address 800-333-1000 has not been placed into a campaign, the server 600 does not answer the call or rejects the call in a manner which does not result in a charge. The server 600 logs information associated with the call event in a call detail data store 900, including the call signaling, call duration, and whether other information was detected during the call (e.g., modem tones, dtmf tones, voice, etc.). Optionally, the server 600 repeats States 1 and State 2 for a plurality of received calls.

State 3 of FIG. 3.

In response to an administrator/user configuration action, the toll-free number 800-333-1000 phone address is placed by the system 1005 into a campaign. In this example embodiment, the phone number is placed in an email announcing a 30% off storewide sale on July 4$^{th}$. Optionally, the system 1005 or a separate marketing system sends the email to a list of prospective and/or current account customers.

State 4 of FIG. 3.

The server 600 receives a call to 800-333-1000 from 805-776-1230.

State 5 of FIG. 3.

The server 600 monitors the voice channel of the inbound call. The server 600 queries the data store 900 (optionally, as a single query or multiple queries to a single or multiple data stores 900) to determine the routing of the call and certain status information of the calling party phone address. Optionally, the query parameters include, for example, the calling and/or called number in the call signaling information associated with the received call. The status query can include but is not limited to: the receipt of a call by the system from 805-776-1230 prior to the toll free number 800-333-1000 being placed into the marketing campaign; the receipt of a call by the system from 805-776-1230 prior to the toll free number 800-333-1000 being placed in association with a marketing communication (e.g., an email communication, display ad, etc.) associated with the marketing campaign; if 805-776-1230 is currently on a spam call list of the current marketing campaign or any other current or previous marketing campaign; if 805-776-1230 is currently marked as a likely fraudulent/spam call on a third party data store, etc. In response to the query, the data store 900 returns a phone address associated with a call center of the merchant/advertiser and an indication that the call from 805-776-1230 is not likely spam.

State 6 of FIG. 3.

The server 600 originates an outbound call to the call center of the merchant/advertiser.

State 7 of FIG. 3.

The server 600 answers the inbound call from 805-776-1230 and bridges the inbound call to the outbound call to the call center.

State 8 of FIG. 3.

The server 600 monitors the bridged call. Upon detection of a call termination event of either call leg, the remaining call leg is terminated. Call detail information associated with the call is logged to the data store 900.

State 9 of FIG. 3.

The system 1005 credits an affiliate for the bridged/completed call and/or charges an advertiser/merchant for the bridged/completed call.

State 10 of FIG. 3.

The server 600 receives a call to 800-333-1000 from 805-776-1231.

State 11 of FIG. 3.

The server 600 monitors the voice channel of the inbound call. The server 600 queries the data store 900 to determine the routing of the call and certain status information of the calling party phone address. The data store 900 returns a phone address associated with a call center of the merchant/advertiser and an indication that a call from 805-776-1231 is a candidate spam call. In this example embodiment, the calling party (as determined from the calling party identification field) had previously received a candidate spam designation in response to a call from the calling party to a phone address which had not been placed into a marketing campaign. Optionally, certain additional call treatment is applied in calls flagged as candidate spam calls. For example, additional internal or external data store queries may be invoked, additional call processing resources (e.g., speech-to-text, tone recognizers, etc.) may be attached during the monitoring of the call, etc.

State 12 of FIG. 3.

The server 600 originates an outbound call to the call center of the merchant/advertiser.

State 13 of FIG. 4.

The server 600 answers the inbound call from 805-776-1231 and bridges the inbound call to the outbound call to the call center.

State 14 of FIG. 4.

The server 600 monitors the bridge call. Upon detection of a call termination event of either call leg, the remaining call leg is terminated. Call detail information associated with the call is logged to the data store 900. If the duration of the call falls below a short duration call configurable variable (e.g., 5 seconds, 15 seconds, 29 seconds, etc.), if the system had previously received one or more short duration call occurrences from 805-776-1231, and/or if an indication is received from the call center that the call is spam (e.g., an indication over a data connection linking the call center and the system 1005 or a received dtmf tone/voice command in response to a call center call agent action), the call is marked as spam. Other call attributes, as described herein above, may be detected during the call which result in the call being marked as a candidate spam call or spam call including but not limited to: the detection on the inbound call leg of a fax tone; the detection on the incoming call leg of a dtmf tone in the absence of any voice detection; the detection of an A, B, C, or D dtmf tone; the detection of recorded announcement and/or phrase which has previously been detected on a spam call; the lack of voice or touch-tone response to a system prompt; the detection of a call in an unlikely state of the marketing campaign (e.g., 30 days after the July 4$^{th}$ sale event); etc.

State 15 of FIG. 4.

The system 1005 credits an affiliate for the bridged/completed call and/or charges an advertiser/merchant for the bridged/completed call.

State 16 of FIG. 4.

The server 600 receives a call to 800-333-1000 from 805-776-1232.

State 17 of FIG. 4.

The server 600 monitors the voice channel of the inbound call. The server 600 queries the data store 900 to determine the routing of the call and certain status information of the calling party phone address. The data store 900 returns a phone address associated with a call center of the merchant/advertiser and an indication that a call from 805-776-1232 is not a candidate spam call or spam caller.

State 18 of FIG. 4.

The server detects a fax tone in the voice channel of the inbound call.

State 19 of FIG. 4.

The server 600 does not answer the call or rejects the call in a manner which does not result in a charge to the system 1005 provider.

State 20 of FIG. 4.

Call detail information associated with the call is logged to the data store 900. The calling phone number 805-776-1232 is also stored in data store 900 in a spam call list wherein the spam call list is used to determine which future calls to the system 1005 are to be blocked.

State 21 of FIG. 4.

In response to the call being marked as spam, the system 1005 does not credit an affiliate for the call and/or does not charge the advertiser/merchant for the call.

State 22 of FIG. 4.

Subsequent to the received call in State 16, server 600 receives a call to 800-333-1000 from 805-776-1232.

State 23 of FIG. 4.

The server 600 monitors the voice channel of the inbound call. The server 600 queries the data store 900 to determine the routing of the call and certain status information of the calling party phone address. The data store 900 returns a phone address associated with a call center of the merchant/advertiser and an indication that 805-776-1232 is on a spam call list.

State 24 of FIG. 4.

The server 600 does not answer the call or rejects the call in a manner which does not result in a charge. Optionally, if a voice is detected on the inbound call prior to rejecting the call, the system optionally presents an interactive voice response menu to the caller in order to determine if the call was mischaracterized as a spam call or the system 1005 proceeds to originate an outbound call to the call center, bridge the call, and log the call as illustrated in States 6-9. Optionally, if the phone address 805-776-1232 is determined to not be from a spammer, the phone address is removed by the system from the spam call list in data store 900.

State 25 of FIG. 5.

Call detail information associated with the call is logged to the data store 900.

State 26 of FIG. 5.

The system 1005 does not credit an affiliate for the call and/or does not charge the advertiser/merchant for the call.

State 27 of FIG. 5.

The server 600 receives a call to 800-333-1000 from 805-776-1233.

State 28 of FIG. 5.

The server 600 monitors the voice channel of the inbound call. The server 600 queries the data store 900 to determine the routing of the call and certain status information of the calling party phone address. The data store 900 returns a phone address associated with a call center of the merchant/advertiser and an indication that a call from 805-776-1233 is a not a candidate spam call.

State 29 of FIG. 5.

The server 600 originates an outbound call to the call center of the merchant/advertiser.

State 30 of FIG. 5.

The server 600 answers the inbound call from 805-776-1233 and bridges the inbound call to the outbound call to the call center.

State 31 of FIG. 5.

The server 600 monitors the bridge call. The server 600 detects a modem tone originating on the inbound call leg. The inbound call leg is terminated. Optionally, the server 600 plays a voice prompt to the call center agent informing the agent of the detected spam call. (Optionally, the server 600 does not take an action in response to the detection of the modem tone if certain conditions are met, (e.g., the bridged call exceeds a certain call duration, voice energy is detected on both legs of the call, etc.))

State 32 of FIG. 5.

The call leg to the call center is terminated.

State 33 of FIG. 5.

Call detail information associated with the call is logged to the data store 900. The call is marked as spam and stored in the spam call list in data store 900.

State 34 of FIG. 5.

In response to the call being marked as spam, the system 1005 does not credit an affiliate for the call and/or does not charge the advertiser/merchant for the call.

Example 2

Figure 6:
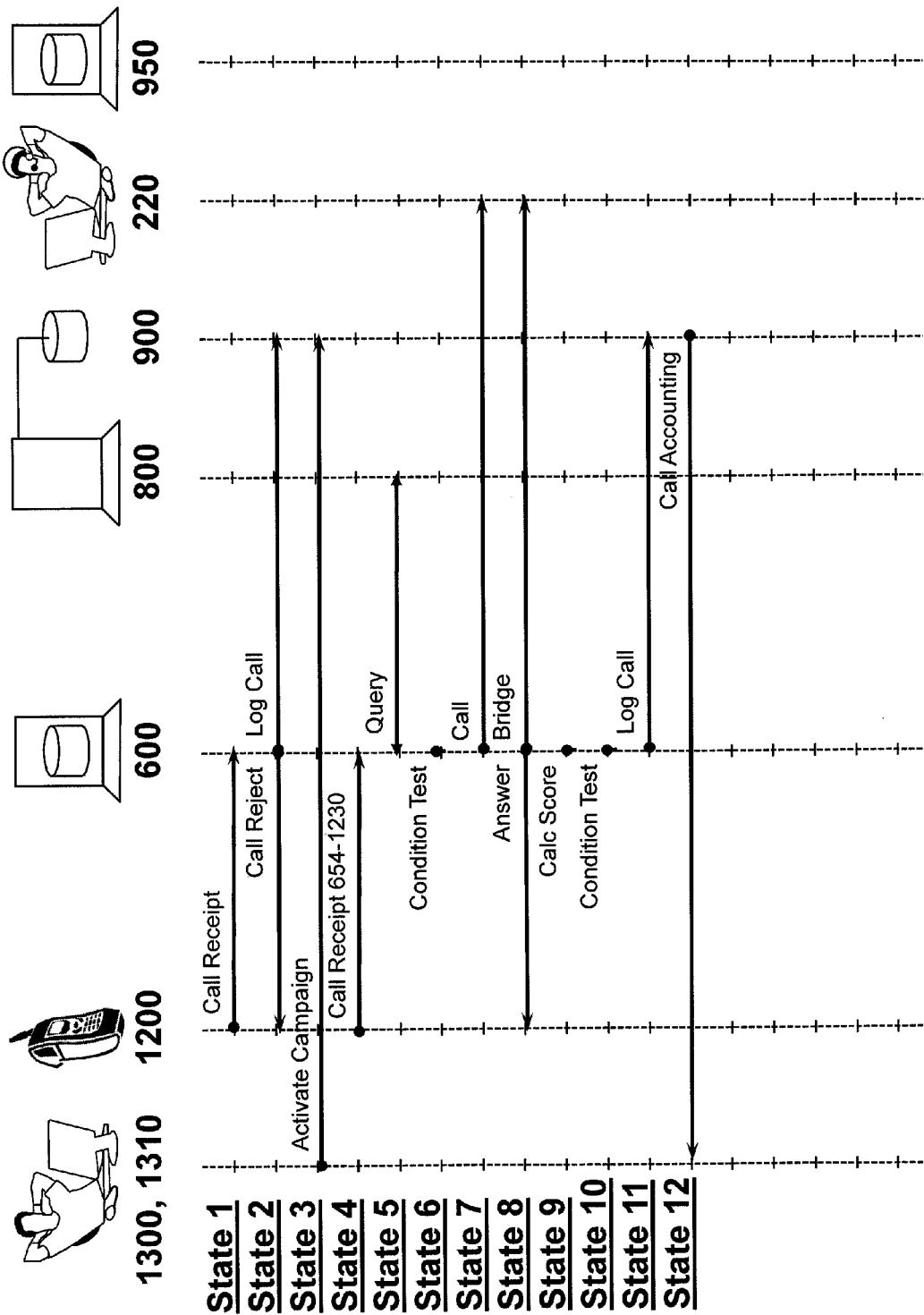
FIG. 6-8: illustrate an example second operating environment/process for a communications system.
Figure 7:
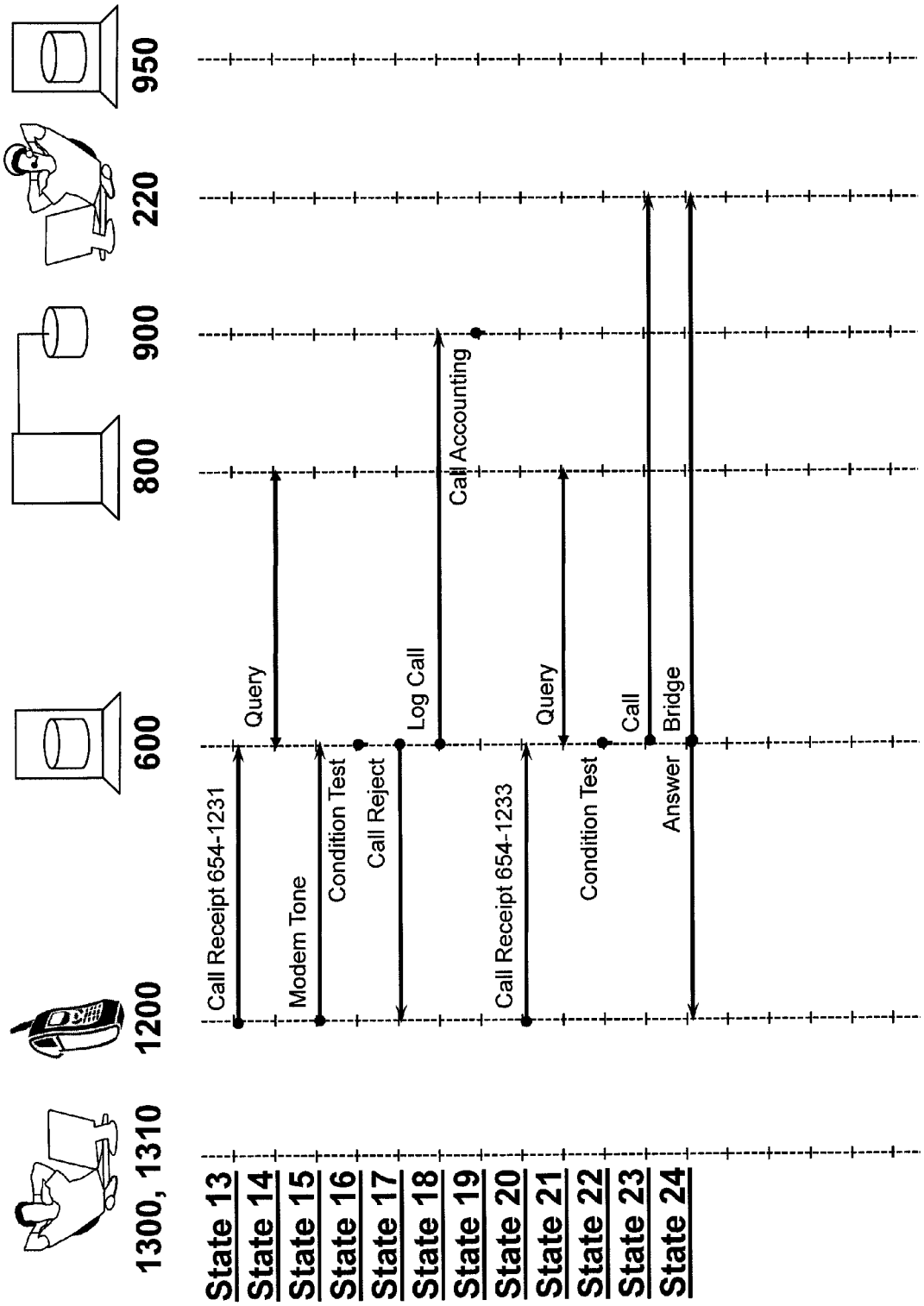
Figure 8:
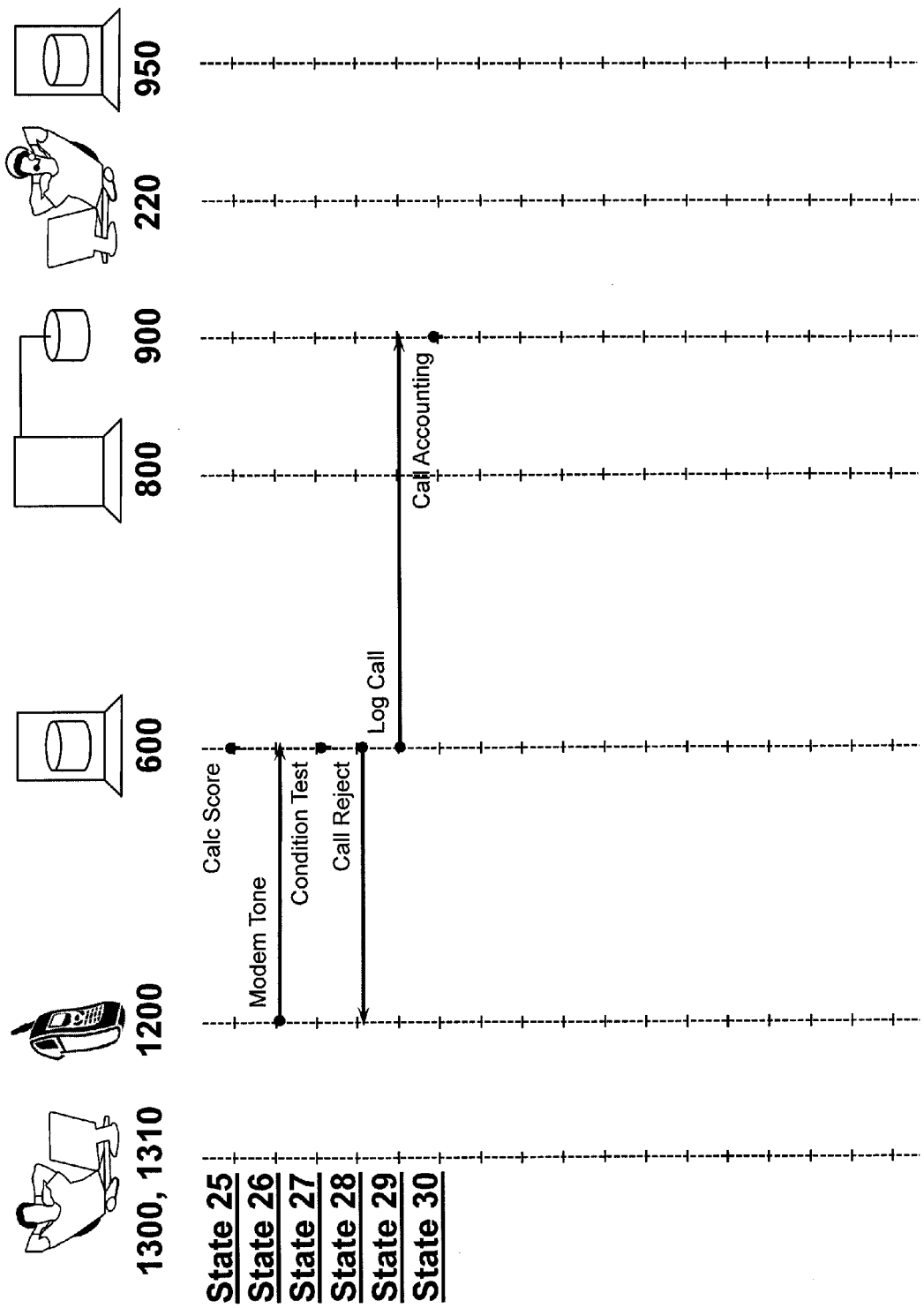

FIGS. 6 through 8 illustrate a second example operational flow of the system 1005 discussed above. Process states are listed on the left and elements of the operating environment of FIG. 2 are listed across the top. The states below depicts an example embodiment of the system in which a marketing campaign of a merchant engages a collection of prospective customers regarding a December storewide sale. In this example embodiment, during the course of the marketing campaign, the system 1005 identifies certain calls as potential fraudulent and fraudulent (e.g. spam) calls. Further, in this example embodiment, the system 1005 does not charge the merchant for determined spam calls.

In the example embodiment below, the states below are intended to highlight/overview the operation of the system 1005 and not detail every operation of the system in an example marketing campaign. In the example embodiment below, the merchant/advertiser 300 previously created an account in the system 1005 and configured a marketing campaign (e.g., in a marketing automation system operating in conjunction with the system 1005 or as an integral part of the system 1005).

State 1 of FIG. 6.

In this example embodiment, the server 600 receives a call directed to a toll-free number, 800-555-1000, wherein the toll-free number is allocated from a pool of numbers assigned to the system 1005 (or the provider of system 1005). Optionally, the call is a Public Switched Telephone Network (PSTN) call received, for example, by the system over an IP connection. Optionally, conventional call signaling is received in association with the call.

State 2 of FIG. 6.

As the phone address 800-555-1000 has not been placed into a campaign, the server 600 does not answer the call or rejects the call in a manner which does not result in a charge. The server 600 logs information associated with the call event in a call detail data store 900, including the call signaling, call duration, and whether other information was detected during the call (e.g., modem tones, dtmf tones, voice, etc.). Optionally, the server 600 repeats States 1 and State 2 for a plurality of received calls.

State 3 of FIG. 6.

In response to an administrator/user configuration action, the toll-free number 800-555-1000 phone address is placed by the system 1005 into a campaign. In this example embodiment, the phone address is placed in an ad banner (dynamically (e.g., the assignment of a phone address, such as a RingPool phone address, in the context of each banner advertisement display request (see also Example 3 herein below)) and/or fixed within the advertisement) announcing a 50% off storewide sale in December. Optionally, the system 1005 or a separate marketing system displays the ad to a list of prospective and/or current account customers in response to web requests, search requests, etc.

State 4 of FIG. 6.

The server 600 receives a call to 800-555-1000 from 805-654-1230.

State 5 of FIG. 6.

The server 600 monitors the voice channel of the inbound call. The server 600 queries the data store 900 to determine the routing of the call. The data store 900 returns a phone address associated with a call center of the merchant/advertiser. In this example embodiment, the server 600 generates a first score for the 805-654-1230 call wherein the first score (e.g., a numeric score, color score (green, yellow, red, etc.), etc.) is based at least on one or more pre-answer call attributes of the inbound call from 805-654-1230. Pre-Answer call attributes include but are not limited to: certain historical information associated with received calls from the calling party field; the call signaling information received (or lack thereof) associated with the inbound call or information derived from the call signaling parameters; call receipt time and date; marketing campaign status and states; calling party phone number pattern; whether the calling party number is identified as spam; determined calling party geography/location; privacy indicator state; call receipt time-of-day; call receipt day-of-week; hours of call center operation; call receipt on a holiday; detection of a tone and type of tone (e.g., fax, modem, dtmf) and/or other call parameters, events, and factors described herein in the specification.

State 6 of FIG. 6.

The server 600 determines if the first score for the 805-654-1230 call satisfies a first condition (e.g., if a numeric score exceeds a configured amount or if a color score falls into a certain color range).

State 7 of FIG. 6.

In this example embodiment the first condition is not satisfied, the server 600 originates an outbound call to the call center of the merchant/advertiser.

State 8 of FIG. 6.

The server 600 answers the inbound call from 805-654-1230 and bridges the inbound call to the outbound call to the call center.

State 9 of FIG. 6.

The server 600 monitors the bridged call. The server 600 generates a second score for the 805-654-1230 call wherein the second score (e.g., a numeric score, color score (green, yellow, red, etc.), etc.) is based at least on one or more post-answer call attributes of the inbound call from 805-654-1230 or outbound call to the call center. Optionally, a single score is kept with the score adjusted based at least in part on the occurrence of certain events. In this example embodiment, certain post-answer call attributes decrease or increase the second score for the 805-654-1230 call. Post-answer call attributes include but are not limited to: call duration; call termination type (e.g., inbound call termination, outbound call termination); tone detection; call transfer; voice detection; speech phrase detection; agent call designation received in the voice channel; agent actions received via a data channel; and other call occurrence events described herein and/or implicit and explicit information determined from the occurrence of certain events.

State 10 of FIG. 6.

In this example embodiment, neither the second score for the 805-654-1230 call nor a combination of the first score and the second score (optionally, with a different weighting applied to the separate scores) for the 805-654-1230 call satisfies a second condition during the course of the call. Thus, the call is not categorized as spam.

State 11 of FIG. 6.

Upon detection of a call termination event of either call leg, the remaining call leg is terminated. Call detail information associated with the call is logged to the data store 900 wherein the call detail information includes the first score, the second score, and the factors which caused the determination of the first score and the second score for the 805-654-1230 call.

State 12 of FIG. 6.

The system 1005 credits an affiliate for the bridged/completed call and/or charges an advertiser/merchant for the bridged/completed call.

State 13 of FIG. 7.

The server 600 receives a call to 800-555-1000 from 805-654-1231.

State 14 of FIG. 7.

The server 600 monitors the voice channel of the inbound call. The server 600 queries the data store 900 to determine the routing of the call. The data store 900 returns a phone address associated with a call center of the merchant/advertiser. In this example embodiment, the server 600 generates a first score for the 805-654-1231 call wherein the first score (e.g., a numeric score, color score (green, yellow, red, etc.), etc.) is based at least on one or more pre-answer call attributes of the inbound call from 805-654-1231.

State 15 of FIG. 7.

During the course of monitoring the voice channel of the inbound call, the server 600 detects a modem tone originating on the inbound call leg. In response to the detection of the modem tone, the server 600 recalculates the first score for the 805-654-1231 call.

State 16 of FIG. 7.

The server 600 determines if the recalculated first score for the 805-654-1231 call satisfies a first condition (e.g., if a numeric score exceeds a configured amount or if a color score falls into a certain color range).

State 17 of FIG. 7.

In this example embodiment the first condition is satisfied, the inbound call leg is terminated.

State 18 of FIG. 7.

Call detail information associated with the call is logged to the data store 900. The calling phone number 805-654-1231 is marked as spam and stored in the data store 900.

State 19 of FIG. 7.

In response to the spam determination, the system 1005 does not credit an affiliate for the call and/or does not charge the advertiser/merchant for the call State 20 of FIG. 7.

The server 600 receives a call to 800-555-1000 from 805-654-1233.

State 21 of FIG. 7.

The server 600 monitors the voice channel of the inbound call. The server 600 queries the data store 900 to determine the routing of the call. The data store 900 returns a phone address associated with a call center of the merchant/advertiser. In this example embodiment, the server 600 generates a first score for the 805-654-1233 call wherein the first score (e.g., a numeric score, color score (green, yellow, red, etc.), etc.) is based at least on one or more pre-answer call attributes of the inbound call from 805-654-1233.

State 22 of FIG. 7.

The server 600 determines if the first score for the 805-654-1233 call satisfies a first condition (e.g., if a numeric score exceeds a configured amount or if a color score falls into a certain color range).

State 23 of FIG. 7.

In this example embodiment the first condition is not satisfied, the server 600 originates an outbound call to the call center of the merchant/advertiser.

State 24 of FIG. 7.

The first condition is not satisfied and the server 600 answers the inbound call from 805-654-1233 and bridges the inbound call to the outbound call to the call center.

State 25 of FIG. 8.

The server 600 monitors the bridged call. The server 600 generates a second score for the 805-654-1233 call wherein the second score (e.g., a numeric score, color score (green, yellow, red, etc.), etc.) is based at least on one or more second call attributes occurring after answering the call. Optionally, a single score is kept with the score adjusted or recalculated based at least in part on the occurrence of certain events (see above Example 2 State 9 for examples of certain post answer call).

State 26 of FIG. 8.

In this example embodiment, the server 600 detects a modem tone originating on the inbound call leg shortly after answer. In response to the detection of the modem tone, the server 600 recalculates the second score for the 805-654-1233 call.

State 27 of FIG. 8.

The server 600 determines if the recalculated second score for the 805-654-1233 call satisfies a second condition (e.g., if a numeric score exceeds a configured amount or if a color score falls into a certain color range).

State 28 of FIG. 8.

In this example embodiment the second condition is satisfied, the inbound call leg is terminated. Optionally, the server 600 plays a voice prompt to the call center agent informing the agent of the spam call determination. (Optionally, the server 600 does not take an action in response to the detection of the modem tone if certain conditions are met, (e.g., the bridged call exceeds a certain call duration, voice energy is detected on both legs of the call, etc.)) The call leg to the call center is terminated.

State 29 of FIG. 8.

Call detail information associated with the call is logged to the data store 900. The calling phone number 805-654-1233 is marked as spam and stored in the data store 900.

State 30 of FIG. 8.

In response to the spam determination, the system 1005 does not credit an affiliate for the call and/or does not charge the advertiser/merchant for the call.

Example 3

Figure 9:
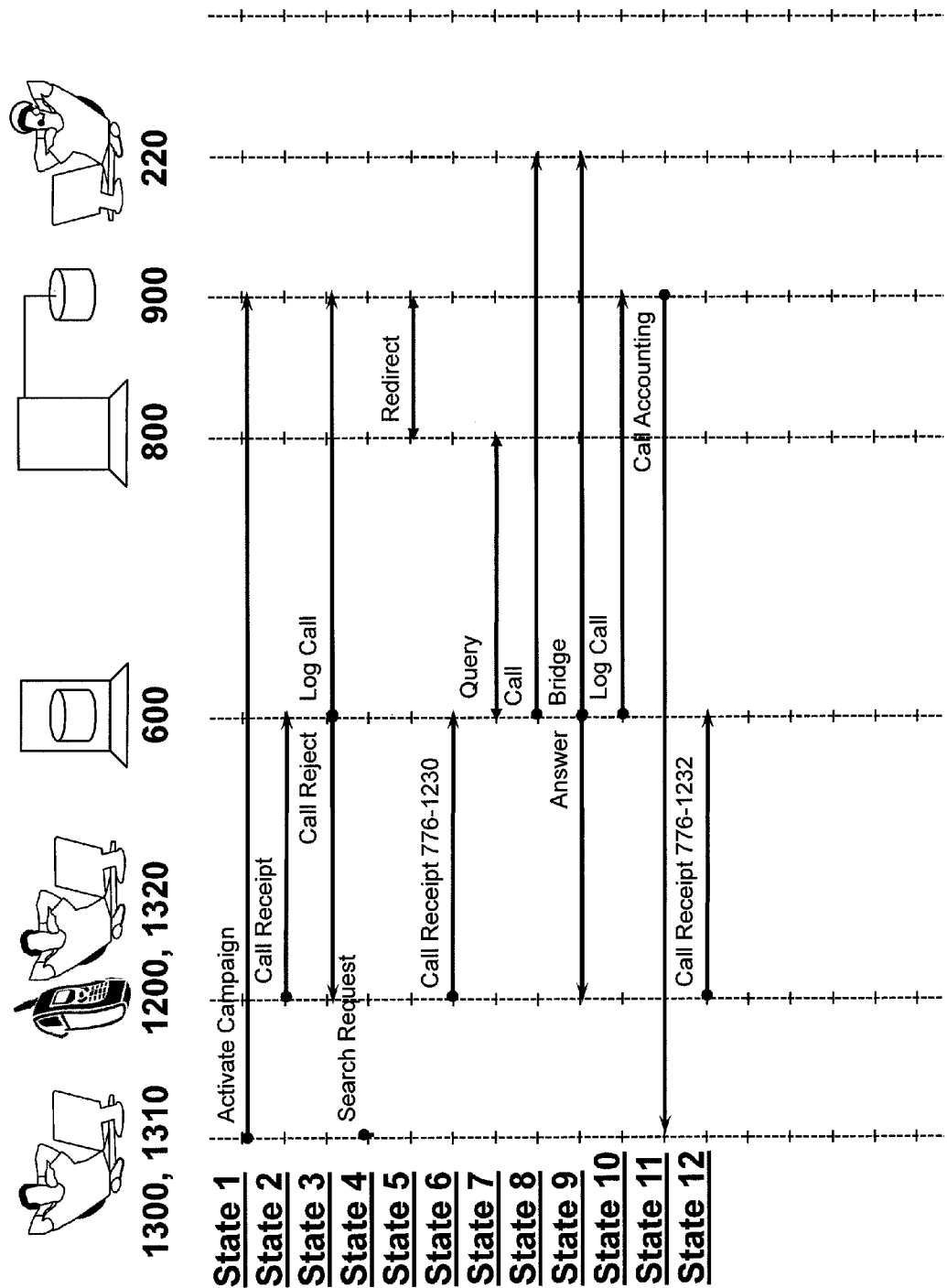
FIG. 9-10: illustrate an example third operating environment/process for a communications system.
Figure 10:
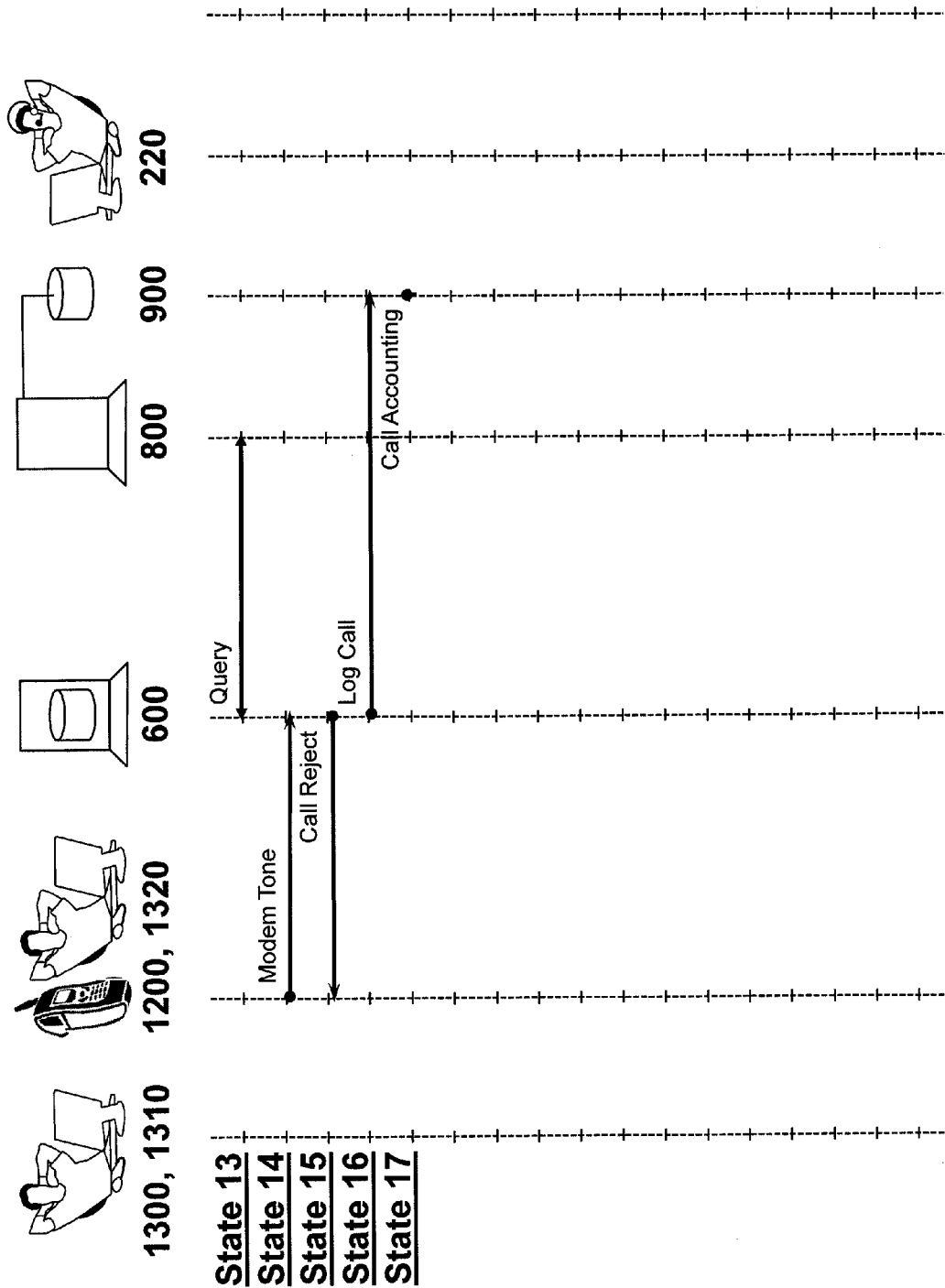

FIGS. 9 through 10 illustrate a third example operational flow of the example system 1005 discussed above. Process states are listed on the left and elements of the operating environment of FIG. 2 are listed across the top. The states below depicts an example embodiment of the system in which a marketing campaign of a merchant engages a collection of prospective customers regarding a storewide sale. In this example embodiment, during the course of the marketing campaign, the system 1005 identifies certain calls as potential fraudulent and fraudulent (e.g. spam) calls. Further, in this example embodiment, the system 1005 does not charge the merchant for determined spam calls.

In the example embodiment below, the states below are intended to highlight/overview the operation of the system 1005 and not detail every operation of the system in an example marketing campaign. In the example embodiment below, the merchant/advertiser 300 previously created an account in the system 1005 and configured a marketing campaign (e.g., in a marketing automation system operating in conjunction with the system 1005 or as an integral part of the system 1005).

State 1 of FIG. 9.

In response to an administrator/user configuration action, a pool of toll-free phone numbers are allocated to a marketing campaign. The toll-free numbers are displayed in response to a web request by a customer prospect. Optionally, different toll-free numbers are displayed for each web session/customer prospect web access to facilitate marketing attribution of paid search or other paid lead generation activity.

State 2 of FIG. 9.

In this example embodiment, the server 600 receives a call directed to a toll-free number, 800-111-1000, wherein the toll-free number is one of a pool of phone addresses (e.g., local and toll free phone numbers) associated with a marketing campaign. Optionally, the call is a Public Switched Telephone Network (PSTN) call received, for example, by the system over an IP connection. Optionally, conventional call signaling is received in association with the call.

State 3 of FIG. 9.

In this example embodiment, the phone address 800-111-1000 while in a marketing campaign has not been associated with a marketing communication to a prospective customer, therefore, the server 600 does not answer the call, rejects the call in a manner which does not result in a call termination charge to the provider of telephony services. Optionally, the server 600 presents an interactive voice response menu to collect additional information about the caller, including why the caller placed a call to an inactive toll-free number. The server 600 logs information associated with the call event in a call detail data store 900, including the call signaling, call duration, and whether other information was detected during the call (e.g., modem tones, dtmf tones, voice, etc.). Optionally, the server 600 repeats States 1 and State 2 for a plurality of received calls.

State 4 of FIG. 9.

A customer prospect enters a search phrase into a search engine query field (e.g., associated with a third party search site, such as Google®). The search engine responds to the search request by displaying a list of results and paid ads including the merchant's ad.

State 5 of FIG. 9.

In response to a customer prospect selection of an ad in the search results, the server 800 receives a web request. The server 800 parses the received URL. The system 1005 allocates the phone address 800-111-1000 from a pool of numbers associated with the marketing campaign. The web request is redirected to the merchant's landing page with the phone address 800-111-1000 included as a parameter in the redirect (and ultimately displayed in association with a landing page of the merchant). Optionally, the phone address 800-111-1000 is associated with the landing page for a session of limited time duration, for example, the length of the customer prospect's web session, the length of time the landing page is displayed to the customer prospect, a fixed duration of time (e.g., 5 minutes, 10 minutes, 15 minutes, etc.), a period of time as determined by a number availability in the number pool, etc. Optionally, when the session period expires, the 800-111-1000 phone address is placed back into the available pool of phone addresses associated with the marketing campaign.

State 6 of FIG. 9.

The server 600 receives a call to 800-111-1000 from 805-776-1230 wherein the call is received during the phone addresses active session.

State 7 of FIG. 9.

The server 600 monitors the voice channel of the inbound call. The server 600 queries the data store 900 (optionally, as a single query or multiple queries to a single or multiple data stores 900) to determine the routing of the call and certain status information of the calling party phone address. The data store 900 returns a phone address associated with a call center of the merchant and an indication that the call is unlikely to be a spam call.

State 8 of FIG. 9.

The server 600 originates an outbound call to the call center of the merchant.

State 9 of FIG. 9.

The server 600 answers the inbound call from 805-776-1230 and bridges the inbound call to the outbound call to the call center.

State 10 of FIG. 9.

The server 600 monitors the bridged call. Upon detection of a call termination event of either call leg, the remaining call leg is terminated. Call detail information associated with the call is logged to the data store 900.

State 11 of FIG. 9.

The system 1005 credits an affiliate for the bridged/completed call and/or charges the merchant for the bridged/completed call.

State 12 of FIG. 9.

The server 600 receives a call to 800-111-1000 from 805-776-1232.

State 13 of FIG. 10.

The server 600 monitors the voice channel of the inbound call. The server 600 queries the data store 900 to determine the routing of the call and certain status information of the calling party phone address. The data store 900 returns a phone address associated with a call center of the merchant and an indication that the call is unlikely to be a spam call.

State 14 of FIG. 10.

The server detects a modem tone in the voice channel of the inbound call.

State 15 of FIG. 10.

The server 600 does not answer the call or rejects the call in a manner which does not result in a charge.

State 16 of FIG. 10.

Call detail information associated with the call is logged to the data store 900. The calling phone number 805-776-1232 is also stored in data store 900 in a spam call list wherein the spam call list is used to determine which future calls to the system are to be blocked.

State 17 of FIG. 10.

In response to the call being marked as spam, the system 1005 does not credit an affiliate for the call and/or does not charge the merchant for the call.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The terminals may optionally include displays, user input devices (e.g., touchscreen, keyboard, mouse, voice recognition, etc.), network interfaces, etc.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the invention can be practiced in many ways. As is also stated above, the use of particular terminology when describing certain features or aspects of certain embodiments should not be taken to imply that the terminology is being re-defined herein to be restricted to including any specific characteristics of the features or aspects of the invention with which that terminology is associated.

What is claimed is:

1. A computer implemented method of call processing, the method comprising:
   receiving over a network, by a computing system comprising hardware, one or more calls to a first phone address, the first phone address not currently associated with a marketing campaign communication;
   storing, by the computing system, one or more calling party phone addresses associated with the one or more received calls prior to the association of the first phone address to the marketing campaign communication;
   associating the first phone address to the marketing campaign communication;
   subsequent to the association of the first phone address to the marketing campaign communication, receiving, at the computing system, a first call to the first phone address;
   prior to answering the first call and at least partly in response to a determination, by the computing system, that a calling party phone address of the first call matches a stored calling party phone address included in the one or more calling party phone addresses associated with the one or more received calls prior to the association of the first phone address to the marketing campaign communication,
      identifying, by the computing system, the first call as a spam call candidate;
   at least partly in response to detecting a modem tone, by the computing system, during the first call,
      identifying, by the computing system, the first call as a spam call and rejecting, by the computing system, the first call; and
   at least partly in response to receiving a second call during a specified marketing campaign state, identifying, by the computing system, the second call as a candidate spam call, wherein the marketing campaign state comprises an indicator of a position of a customer prospect in a marketing campaign funnel.

2. The computer implemented method as defined in claim 1, the computer implemented method further comprising: at least partly in response to detecting the modem tone, storing an indication that future calls from the calling party phone address of the first call are to be blocked.

3. The computer implemented method as defined in claim 1, the computer implemented method further comprising:
   receiving a third call to the first phone address associated with the marketing campaign communication; and
   at least partly in response to determining that a calling party address of the third call is associated with a stored call block indication, rejecting, by the computing system, the end third call.

4. The computer implemented method as defined in claim 1, the computer implemented method further comprising: at least partly in response to detecting a call termination of the first call, occurring within a specified call period of time, identifying the first call as a spam call candidate.

5. The computer implemented method as defined in claim 1, the computer implemented method further comprising: at least partly in response to detecting, during a third call to the first phone address associated with the marketing campaign communication, a fax tone, identifying, by the computing system, the third call as a spam call.

6. The computer implemented method as defined in claim 1, the computer implemented method further comprising: at least partly in response to detecting, during a third call to the first phone address associated with the marketing campaign communication, a Dual-Tone Multi-Frequency (DTMF) tone, by the computing system, wherein the detected DTMF tone is an A, B, C, or D type tone, identifying, by the computing system, the third call as a spam call.

7. The computer implemented method as defined in claim 1, the computer implemented method further comprising: at least partly in response to detecting, during a third call to the first phone address associated with the marketing campaign communication, a Dual-Tone Multi-Frequency (DTMF) tone, by the computing system, wherein the detected DTMF tone is a numeric type DTMF tone, identifying, by the computing system, the third call as a candidate spam call.

8. A system, comprising:
   a computing device;
   a network interface configured to be coupled to a Public Switched Telephone Network (PSTN);
   non-transitory media storing instructions readable by the computing device, that when executed by the computing device, cause the computing device to perform operations, comprising:
   receiving one or more calls to a first phone address, the first phone address not currently associated with a first communication for a customer prospect, wherein the first communication comprises a marketing communication;
   storing one or more calling party phone addresses associated with the one or more received calls prior to the association of the first phone address to the first communication;
   associating the first phone address to the first communication;
   subsequent to the association of the first phone address to the first communication, receiving a first call to the first phone address;
   prior to answering the first call and at least partly in response to a determination that a calling party phone address of the first call matches a stored calling party phone address included in the one or more calling party phone addresses associated with the one or more received calls prior to the association of the first phone address to the first communication,
      identifying the first call as a spam call candidate;
   at least partly in response to detecting a modem tone during the first call,
      identifying the first call as a spam call and rejecting the first call; and
   at least partly in response to receiving a second call during a specified marketing campaign state, identifying, by the computing system, the second call as a candidate spam call, wherein the marketing campaign state comprises an indicator of a position of a customer prospect in a marketing campaign funnel.

9. The system as defined in claim 8, the operations further comprising: at least partly in response to identifying the first call as a spam call, storing an indication that future calls from the calling party phone address of the first call are to be blocked.

* * * * *

UNITED STATES PATENT AND TRADEMARK OFFICE
CERTIFICATE OF CORRECTION

| | | |
|---|---|---|
| PATENT NO. | : 9,167,078 B2 | Page 1 of 1 |
| APPLICATION NO. | : 14/608030 | |
| DATED | : October 20, 2015 | |
| INVENTOR(S) | : Jason S. Spievak | |

It is certified that error appears in the above-identified patent and that said Letters Patent is hereby corrected as shown below:

In The Specification

In column 5 at line 43, After "well" insert --.--.

In column 21 at line 40, After "application" insert --.--.

In column 29 at line 13, After "call" insert --.--.

In The Claims

In column 33 at line 61 (approx.), In Claim 3, after "the" delete "end".

Signed and Sealed this
Third Day of May, 2016

Michelle K. Lee
*Director of the United States Patent and Trademark Office*